(12) United States Patent
Wang et al.

(10) Patent No.: US 12,468,403 B2
(45) Date of Patent: Nov. 11, 2025

(54) MOUSE STRUCTURE

(71) Applicant: Silitek Electronics (Dongguan) Co., Ltd, Guang Dong (CN)

(72) Inventors: Jun Wang, Guang Dong (CN); Wei-Wu Su, Guang Dong (CN)

(73) Assignee: SILITEK ELECTRONICS (DONGGUAN) CO., LTD, Guang Dong (CN)

( * ) Notice: Subject to any disclaimer, the term of this patent is extended or adjusted under 35 U.S.C. 154(b) by 0 days.

(21) Appl. No.: 19/063,379

(22) Filed: Feb. 26, 2025

(65) Prior Publication Data
US 2025/0284349 A1    Sep. 11, 2025

(30) Foreign Application Priority Data

Mar. 8, 2024   (CN) .......................... 202420450720.7
Jan. 2, 2025   (CN) .......................... 202510003745.1

(51) Int. Cl.
*G06F 3/0354*   (2013.01)
*H05K 5/02*   (2006.01)
*H05K 5/03*   (2006.01)

(52) U.S. Cl.
CPC ....... *G06F 3/03543* (2013.01); *H05K 5/0226* (2013.01); *H05K 5/03* (2013.01)

(58) Field of Classification Search
CPC ..... G06F 3/03543; H05K 5/0226; H05K 5/03
USPC ......................................................... 345/163
See application file for complete search history.

(56) References Cited

U.S. PATENT DOCUMENTS

| | | | | |
|---|---|---|---|---|
| 2005/0116933 A1* | 6/2005 | Huang | ................ | G06F 3/03545 345/163 |
| 2010/0259878 A1* | 10/2010 | Wang | ................ | G06F 3/03543 361/679.4 |
| 2021/0342018 A1* | 11/2021 | Dearsley | ................ | G06F 3/044 |

* cited by examiner

*Primary Examiner* — Mark Edwards
(74) *Attorney, Agent, or Firm* — WPAT, PC

(57) ABSTRACT

A bendable mouse structure is provided. The mouse structure includes a main body, an extension portion and at least one first connecting member. The main body includes a button portion. The first connecting member is connected between the main body and the extension portion. The first connecting member includes a first fixing portion, a second fixing portion, a first rotating shaft and a second rotating shaft. The first fixing portion is fixed to one of the main body and the extension portion. The second fixing portion is fixed to another one of the main body and the extension portion. The first rotating shaft passes through the first fixing portion and the second fixing portion, the second fixing portion includes a fixing structure and a joint structure pivotally connected to each other, and the second rotating shaft passes through the fixing structure and the joint structure.

14 Claims, 20 Drawing Sheets

MOUSE STRUCTURE

This application claims the benefit of People's Republic of China Application No. 202420450720.7, filed Mar. 8, 2024 and application No. 202510003745.1, filed Jan. 2, 2025, the subject matters of which are incorporated herein by reference.

BACKGROUND OF THE INVENTION

Field of the Invention

The invention relates in general to a mouse structure, and more particularly to a bendable mouse structure.

Description of the Related Art

With the advancement of technology, people nowadays have a huge demand for computer use, and the demand for mouse structures is also quite high. In particular, the use of computers is not limited to fixed offices, but may need to use computers and mouse structures in different occasions. Therefore, the portability of computers and mouse structures is becoming more and more important. Traditional mouse structures are relatively large and not easy to carry. Therefore, there is still an urgent need to improve the design of mouse structures.

SUMMARY OF THE INVENTION

According to an embodiment of the present invention, a bendable mouse structure is provided. The mouse structure includes a main body, an extension portion and at least one first connecting member. The main body includes a button portion. The first connecting member is connected between the main body and the extension portion. The first connecting member includes a first fixing portion, a second fixing portion, a first rotating shaft and a second rotating shaft. The first fixing portion is fixed to one of the main body and the extension portion. The second fixing portion is fixed to another one of the main body and the extension portion. The first rotating shaft passes through the first fixing portion and the second fixing portion, the second fixing portion includes a fixing structure and a joint structure pivotally connected to each other, and the second rotating shaft passes through the fixing structure and the joint structure.

The above and other aspects of the invention will become better understood with regard to the following detailed description of the preferred but non-limiting embodiment(s). The following description is made with reference to the accompanying drawings.

DETAILED DESCRIPTION OF THE INVENTION

The following will describe in detail various embodiments of the present invention, and with the help of drawings as examples. In addition to these detailed descriptions, the present invention can also be widely implemented in other embodiments, and any easy replacement, modification, and equivalent changes of the embodiments are included in the scope of the present invention and are subject to the subsequent claims. In the description of the specification, in order to give readers a more complete understanding of the present invention, many specific details and implementation examples are provided; however, these specific details and implementation examples should not be regarded as limitations of the present invention. In addition, well-known steps or elements are not described in detail to avoid unnecessary limitations of the present invention.

Figure 1A:
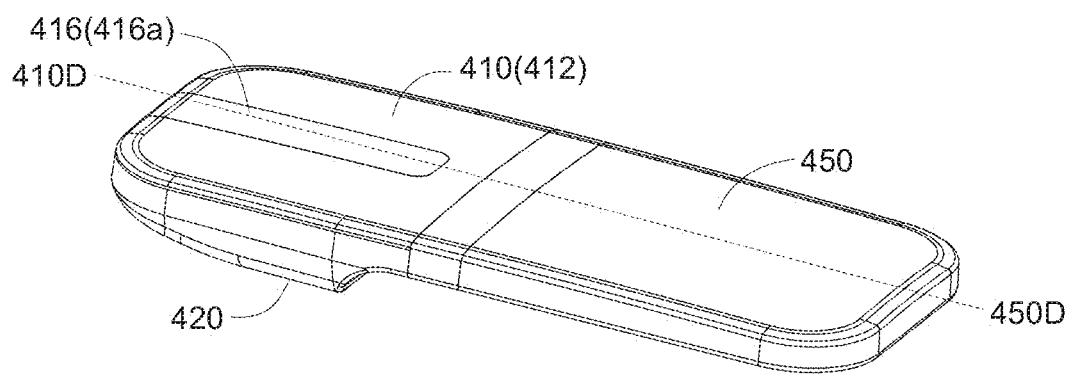
FIG. 1A is a three-dimensional view of a mouse structure in a flattened state according to an embodiment of the present invention.
Figure 1B:
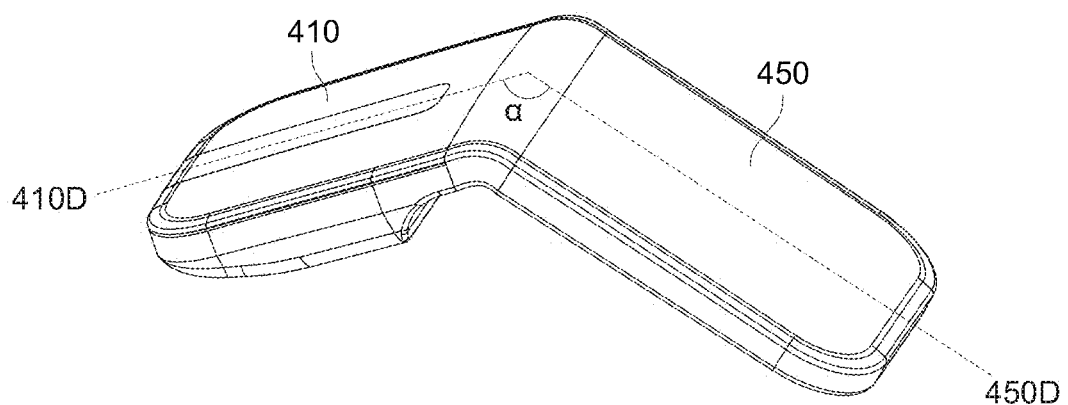
FIG. 1B is a three-dimensional view of the mouse structure in FIG. 1A in a bent state.
Figure 2A:
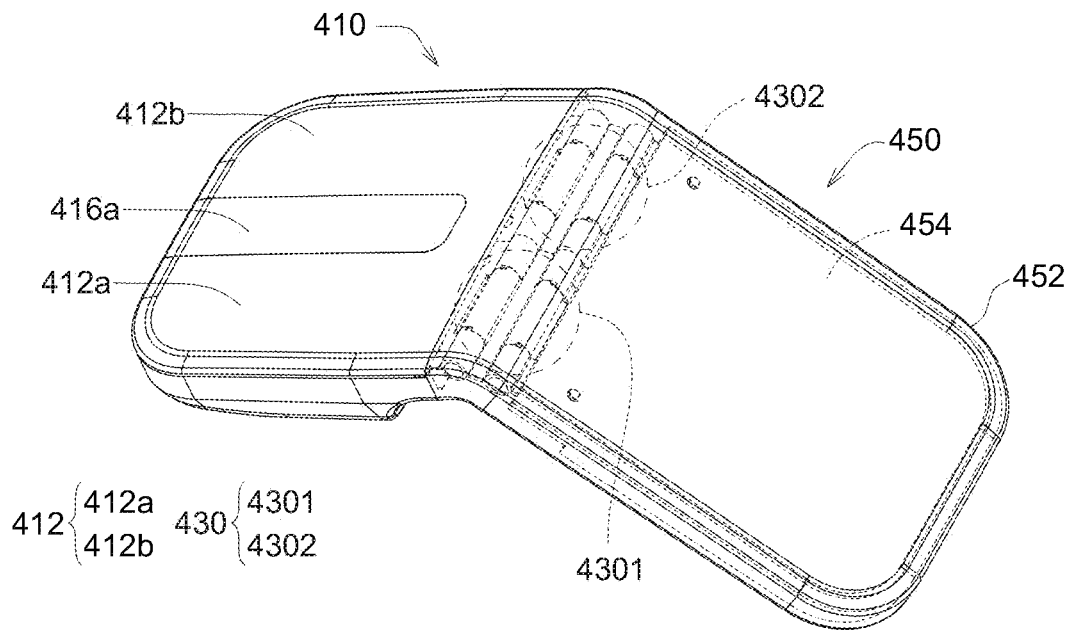
FIG. 2A is a three-dimensional view of the mouse structure in FIG. 1A in a bent state from another perspective.
Figure 2B:
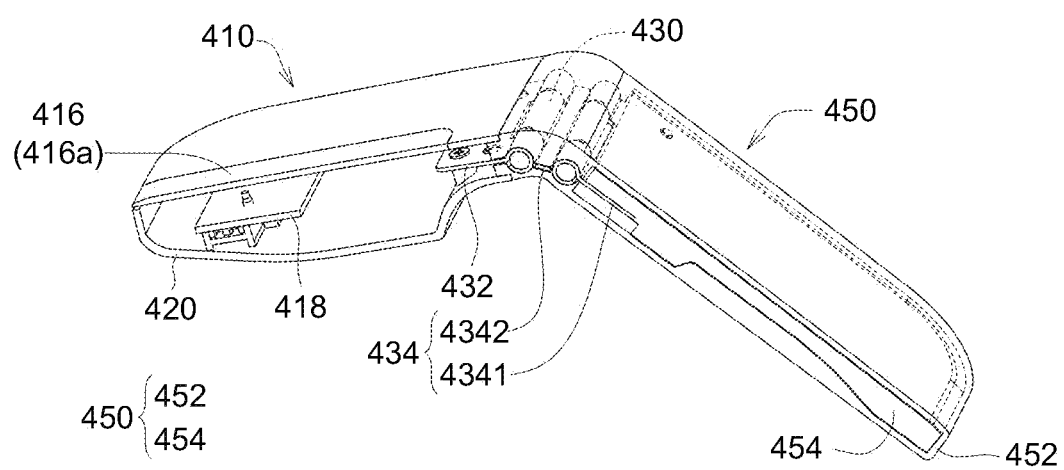
FIG. 2B is a three-dimensional cross-sectional view of FIG. 2A.
Figure 3A:
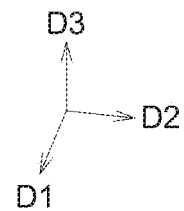
FIG. 3A is a three-dimensional view of the first connecting member of the mouse structure in FIG. 1A in a flattened state.
Figure 3A:
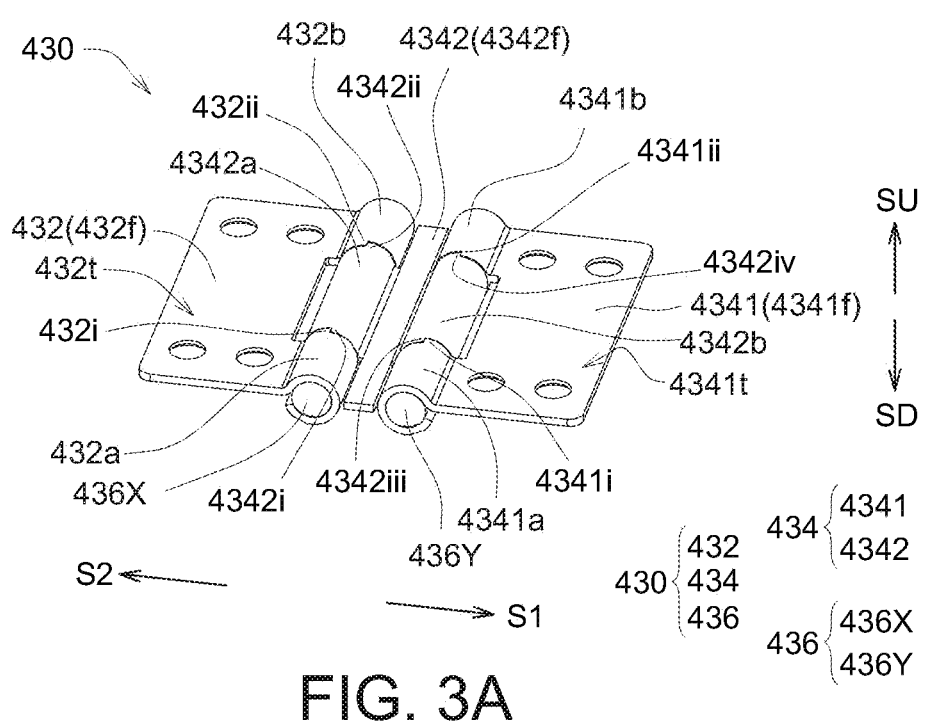
Figure 3B:
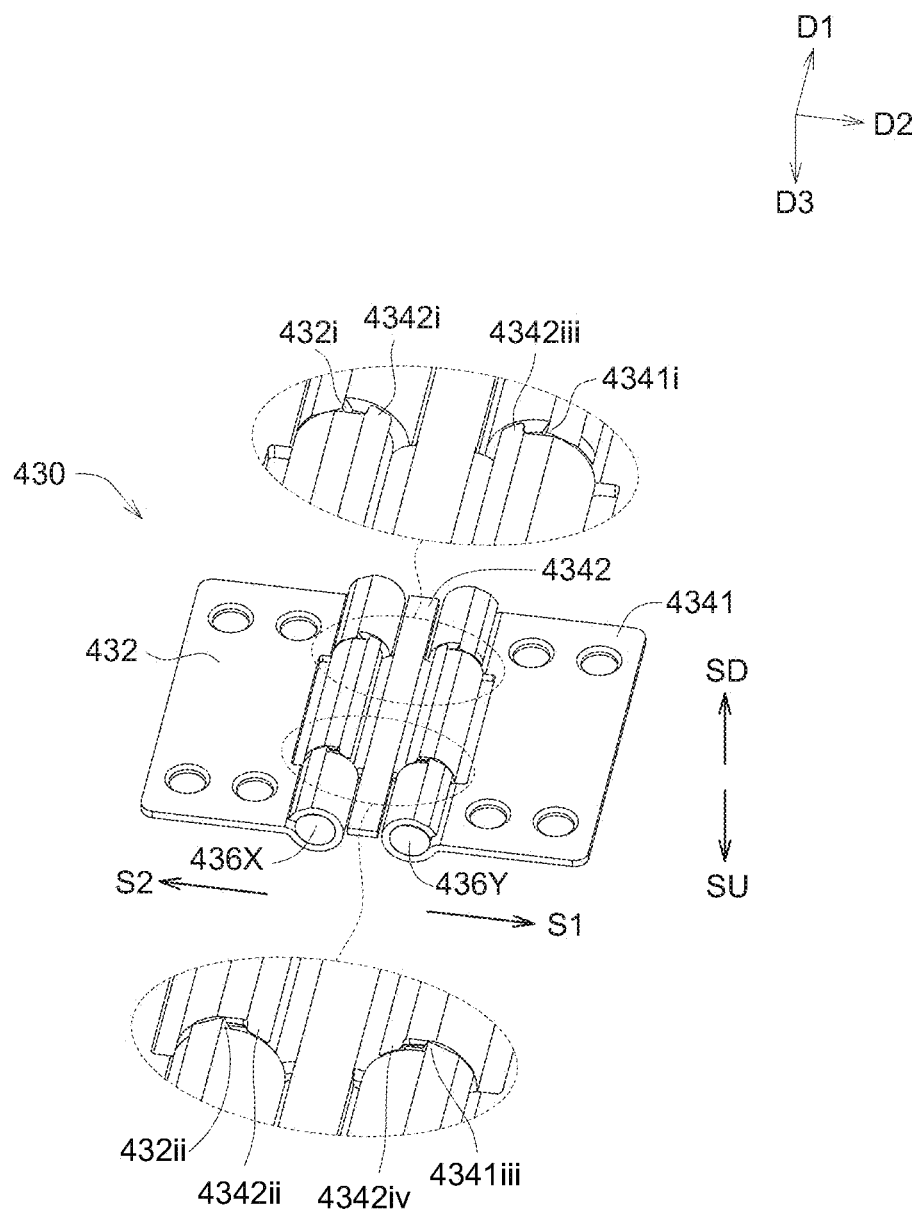
FIG. 3B is a three-dimensional view of the first connecting member of the mouse structure in FIG. 1A in a flattened state from another perspective.
Figure 4A:
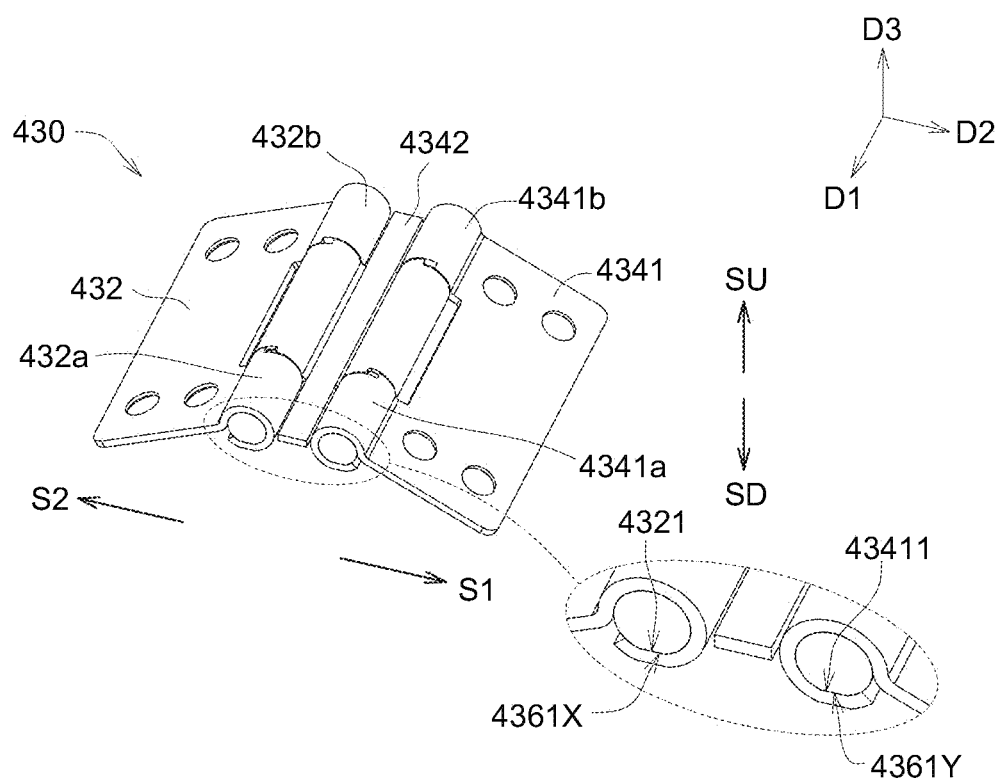
FIG. 4A is a three-dimensional view of the first connecting member of the mouse structure in FIG. 1A in a bent state.
Figure 4B:
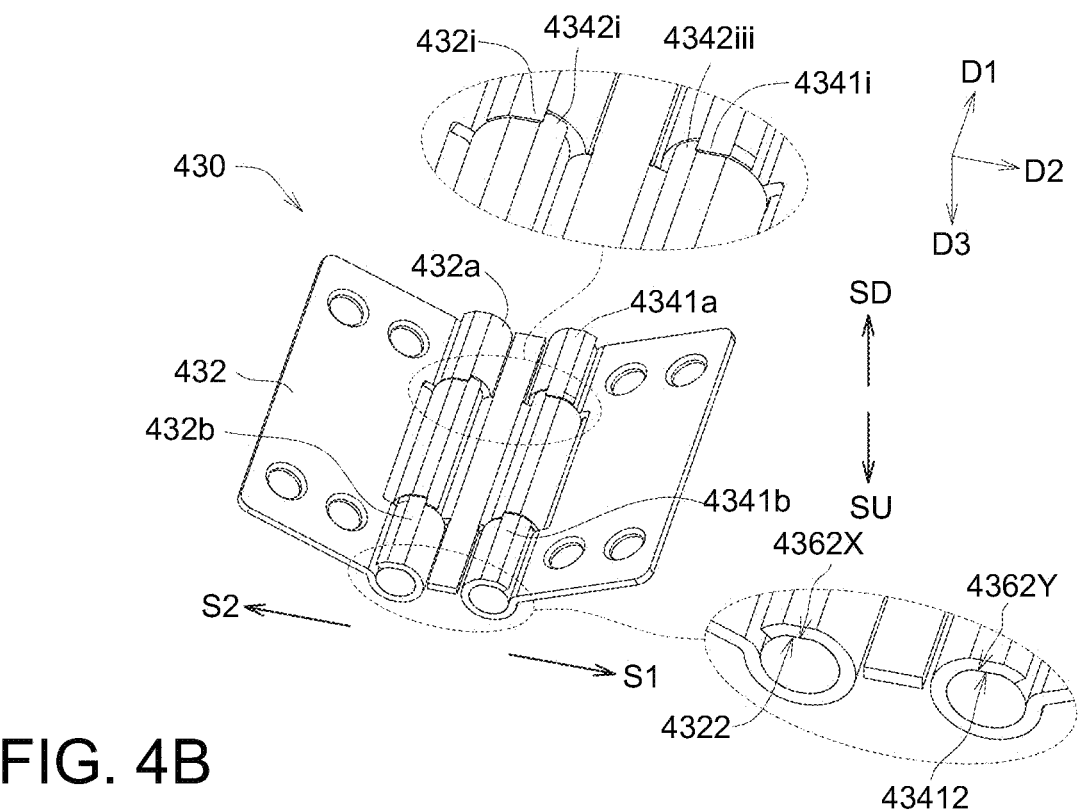
FIG. 4B is a three-dimensional view of the first connecting member of the mouse structure in FIG. 4A.
Figure 4C:
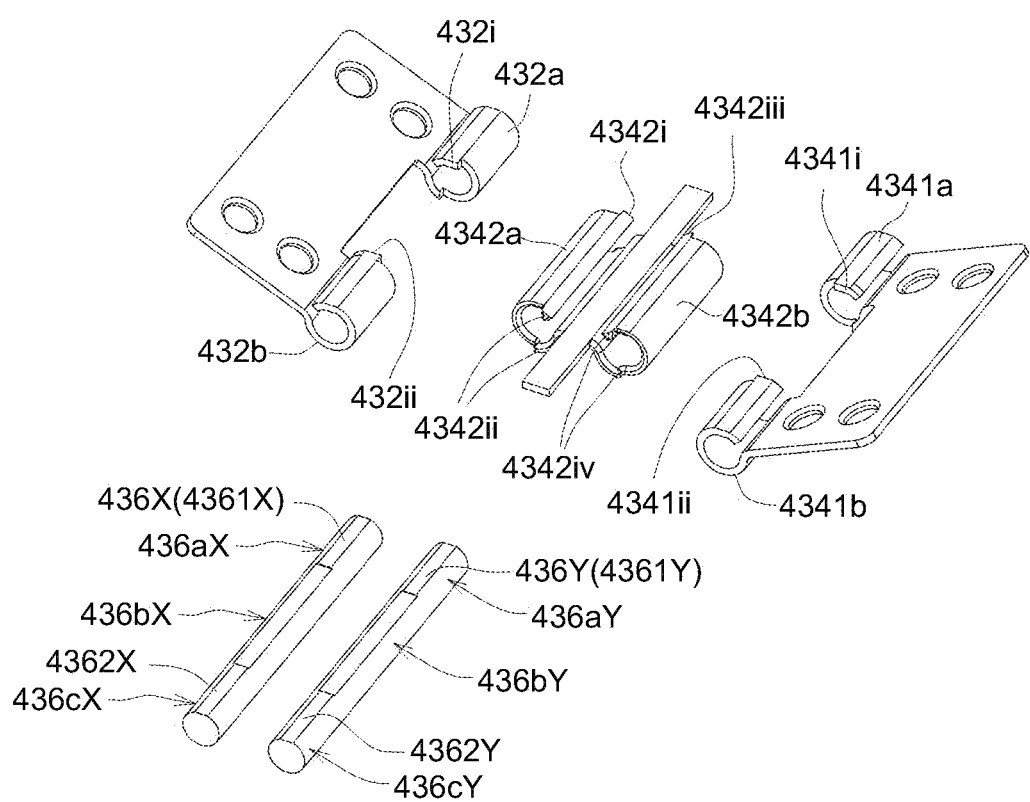
FIG. 4C is a disassembled view of the first connecting member of FIG. 4B.
Figure 5A:
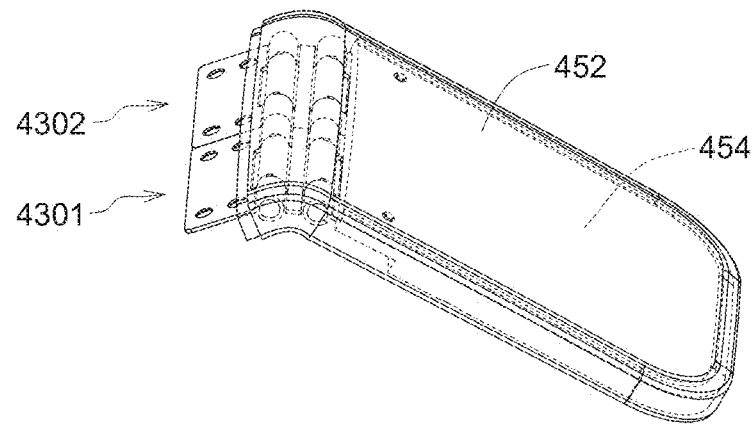
FIG. 5A is a partial perspective view of the mouse structure of FIG. 1A in a bent state.
Figure 5B:
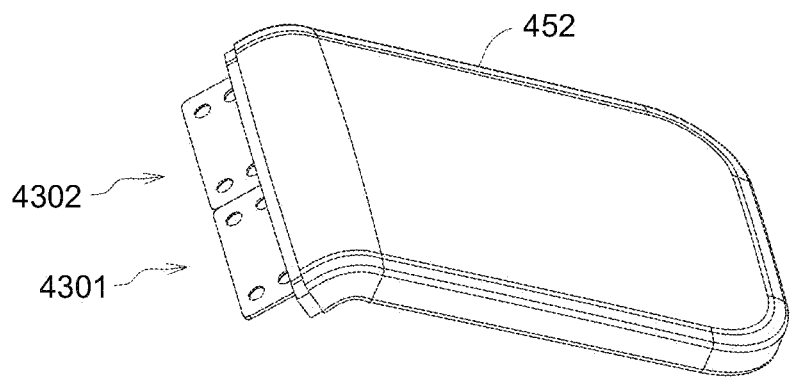
FIG. 5B is a partial three-dimensional view of the mouse structure of FIG. 1A in a bent state.
Figure 5C:
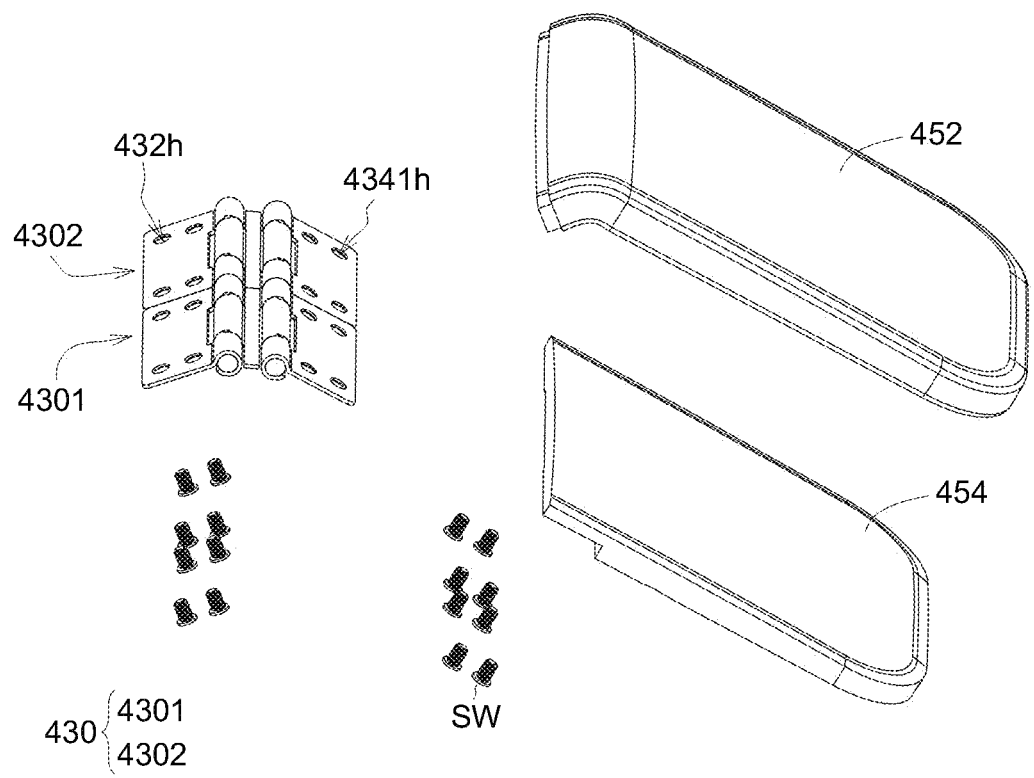
FIG. 5C is a partial disassembled view of the mouse structure of FIG. 1A in a bent state.
Figure 5D:
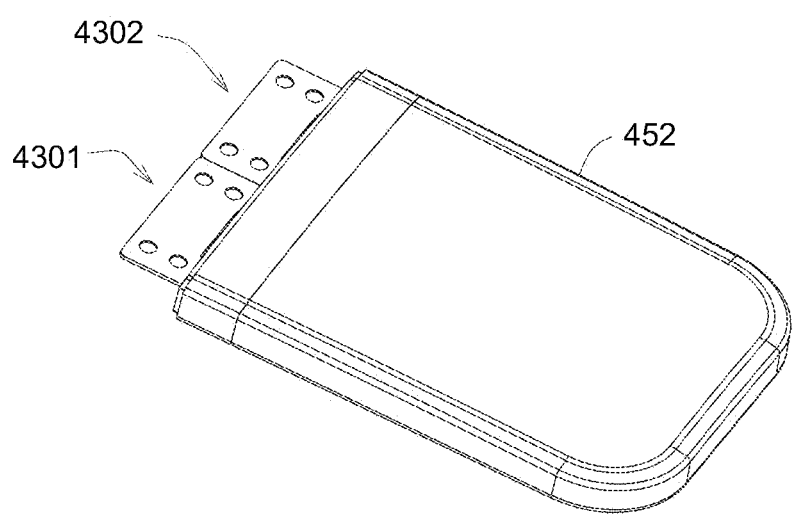
FIG. 5D is a partial three-dimensional view of the mouse structure of FIG. 1A in a flattened state.

FIG. 1A is a three-dimensional view of a mouse structure 40 in a flattened state according to an embodiment of the present invention. FIG. 1B is a three-dimensional view of the mouse structure 40 of FIG. 1A in a bent state. FIG. 2A is a three-dimensional view of the mouse structure 40 of FIG. 1A in a bent state from another perspective. FIG. 2B is a stereoscopic cross-sectional view of the mouse structure 40 of FIG. 2A. FIG. 3A is a three-dimensional view of the first connecting member 430 of the mouse structure 40 of FIG. 1A in a flattened state. FIG. 3B is a three-dimensional view of the first connecting member 430 of the mouse structure 40 of FIG. 1A in a flattened state from another perspective. FIG. 4A is a three-dimensional view of the first connecting member 430 of the mouse structure 40 of FIG. 1A in a bent state. FIG. 4B is a three-dimensional view of the first connecting member 430 of FIG. 4A from another perspective. FIG. 4C is a disassembled view of the first connecting member 430 of FIG. 4B. FIG. 5A is a partial perspective view of the mouse structure 40 of FIG. 1A in a bent state. FIG. 5B is a partial three-dimensional view of the mouse structure 40 of FIG. 1A in a bent state. FIG. 5C is a partial disassembled view of the mouse structure 40 of FIG. 1A in a bent state. FIG. 5D is a partial three-dimensional view of the mouse structure 40 of FIG. 1A in a flattened state. FIG. 5A to FIG. 5D omit the main body 410, for example.

Please refer to FIGS. 1A to 2B. The mouse structure 40 is a bendable mouse structure. When the user does not need to use the mouse structure 40 for work, the mouse structure 40 can be unbent and flattened, which is convenient for storage and carrying, as shown in FIG. 1A. When the user needs to use the mouse structure 40 for work, the mouse structure 40 can be bent so that the user's hand can hold it comfortably and it is easy for operation, as shown in FIGS. 1B to 2B.

The mouse structure 40 includes a main body 410, an extension portion 450, and at least one first connecting member 430. The first connecting member 430 is connected between the main body 410 and the extension portion 450, and allows the main body 410 and the extension portion 450 to move relative to each other (for example, rotate), thereby switching the mouse structure 40 between a flattened state and a bent state. As shown in FIG. 1A, a longitudinal extension direction 410D of the main body 410 and a longitudinal extension direction 450D of the extension portion 450 overlap or are parallel to each other, presenting a flattened state. As shown in FIG. 1B, a specific angle α is maintained between the longitudinal extension direction 410D of the main body 410 and the longitudinal extension direction 450D of the extension portion 450, presenting a bent state. The specific angle α is, for example, between 120 degrees and 140 degrees, but the present invention is not limited thereto, and the specific angle α can be adjusted according to product requirements.

The main body 410 includes a button portion 412, an upper cover 416 (FIG. 2B), a circuit assembly 418 (FIG. 2B), and a lower cover 420. The circuit assembly 418 is disposed on the lower cover 420, the upper cover 416 is disposed on the lower cover 420, and the button portion 412 covers the upper cover 416. The button portion 412 may include a left button 412a and a right button 412b. The upper cover 416 may include a middle button 416a. In the present embodiment, there is a gap between the left button 412a and the right button 412b to provide a space for the middle button 416a. The middle button 416a may be a touch pad, but the present invention is not limited thereto. In other embodiments, the middle button 416a may be a roller. The circuit assembly 418 may include a circuit board (not shown) and a switch element (not shown). The switch element (not shown) is disposed on the circuit board (not shown) and partially passes through a hole (not shown) corresponding to the upper cover 416. The left button 412a and the right button 412b correspond to their respective switch elements (not shown) and (not shown). When the user presses the left button 412a or the right button 412b, the left button 412a or the right button 412b can touch the switch element (not shown) to generate a corresponding control signal and transmit it to the sensor (not shown). The extension portion 450 includes a back cover 452 and a base 454, and the base 454 is buried in the back cover 452 (details are as follows).

Please refer to FIGS. 2A-2B and 5C. The first connecting member 430 is fixed to a bottom surface of a rear end of the upper cover 416 (one end adjacent to the extension portion 450) and a bottom surface (e.g., a recess) of a front end of the extension portion 450 (one end adjacent to the main body 410) by screws SW, but the present invention is not limited to this. The upper cover 416 and the back cover 452 cover the first connecting member 430.

Referring to FIGS. 2A-2B, 3A-4C and 50, the first connecting member 430 includes a first fixing portion 432, a second fixing portion 434 and at least one rotating shaft 436. The first fixing portion 432 can be fixed to one of the main body 410 and the extension portion 450; the second fixing portion 434 can be fixed to another one of the main body 410 and the extension portion 450. For example, in the present embodiment, the first fixing portion 432 is fixed to the main body 410, and the second fixing portion 434 is fixed to the extension portion 450, as shown in FIG. 2B, but the present invention is not limited thereto. In other embodiments, the first fixing portion 432 is fixed to the extension portion 450, and the second fixing portion 434 is fixed to the main body 410.

In the present embodiment, the number of the first connecting members 430 is two, and the two first connecting members 430 (4301 and 4302) are arranged side by side between the main body 410 and the extension portion 450 (FIGS. 2A and 5C). The number of rotating shafts 436 of each of the first connecting members 430 is two (i.e., there are four rotating shafts 436 in total). For example, at least one rotating shaft 436 includes a first rotating shaft 436X and a second rotating shaft 436Y. The first rotating shaft 436X and the second rotating shaft 436Y are adjacent to each other and parallel to each other. The structures of the two first connecting members 430 are, for example, the same as each other, and FIGS. 3A to 4C are only exemplary of one of the first connecting members 430. It should be understood that the numbers of first connecting members 430 and rotating shafts 436 of the present invention are not limited thereto. In other embodiments, the number of the first connecting member 430 may be one or greater than two, and the number of the rotating shaft 436 of each of the first connecting member 430 may be one.

Referring to FIGS. 3A to 4C, the longitudinal extension direction of the at least one rotating shaft 436 (e.g., the first rotating shaft 436X and the second rotating shaft 436Y) may be the first direction D1, a working plane on which the mouse structure 40 is placed may be parallel to the second direction D2, and a normal direction of the working plane on which the mouse structure is placed may be the third direction D3. The first direction D1, the second direction D2, and the third direction D3 may be perpendicular to each other. The first rotating shaft 436X passes through the first fixing portion 432 and the second fixing portion 434, so that the first fixing portion 432 and the second fixing portion 434 are pivotally connected to each other, that is, the main body 410 and the extension portion 450 are pivotally connected to each other through the first connecting member 430. The second fixing portion 434 includes a fixing structure 4341 and a joint structure 4342 that are pivotally connected to each other. The joint structure 4342 is disposed between the first fixing portion 432 and the fixing structure 4341. The first rotating shaft 436X passes through the first fixing portion 432 and the joint structure 4342, and the second rotating shaft 436Y passes through the fixing structure 4341 and the joint structure 4342. As shown in FIG. 4C, the first rotating shaft 436X includes a first damping structure 4361X and a second damping structure 4362X, and the second rotating shaft 436Y includes a first damping structure 4361Y and a second damping structure 4362Y. In detail, the first rotating shaft 436X includes a first end portion 436aX, a first middle portion 436bX, and a second end portion 436cX extending axially (i.e., extending along the first direction D1), the first middle portion 436bX is connected between the first end portion 436aX and the second end portion 436cX, and the first damping structure 4361X and the second damping structure 4362X are respectively disposed on the first end portion 436aX and the second end portion 436cX. The second rotating shaft 436Y includes a third end 436aY extending axially (i.e. extending along the first direction D1), a second middle portion 436bY and a fourth end portion 436cY, the second middle portion 436bY is connected between the third end portion 436aY and the fourth end portion 436cY, and the third damping structure 4361Y and the fourth damping structure 4362Y are respectively disposed on the third end portion 436aY and the fourth end portion 436cY. The first damping structure 4361X, the second damping structure 4362X, the third damping structure 4361Y and the fourth damping structure 4362Y can be a non-curved surface (i.e. a flat plane without arc) respectively, for providing resistance at a specific position (e.g. a position in a bent state) during the rotation of the first rotating shaft 436X and the second rotating shaft 436Y.

As shown in FIG. 3A, the first fixing portion 432 includes a first sheet portion 432f and a first curved portion 432a and a second curved portion 432b connected to the first sheet portion 432f. The first curved portion 432a and the second curved portion 432b are separated from each other in the first direction D1. That is, the first curved portion 432a and the second curved portion 432b have a gap in the first direction D1, and the first curved portion 432a and the second curved portion 432b respectively surround at least a portion of the first end portion 436aX and the second end portion 436cX (shown in FIG. 4C). As shown in FIG. 4A, the first curved portion 432a includes a first contact surface 4321 (e.g., an inner surface) adjacent to the first end portion 436aX (FIG. 4C). As shown in FIG. 4B, the second curved portion 432b includes a second contact surface 4322 (e.g., an inner surface) adjacent to the second end portion 436cX (FIG. 4C), and the first contact surface 4321 and the second contact surface 4322 can be a non-curved surface (i.e., a flat plane without arc) respectively, which are used to cooperate with the first damping structure 4361X and the second damping structure 4362X to provide resistance at a specific position (e.g., the position in the bent state) during the rotation of the first rotating shaft 436X. In the first curved portion 432a, the two opposite sides adjacent and connected to the first contact surface 4321 (e.g., corresponding to the first side S1 and the second side S2 of FIG. 4A) are curved surfaces, and in the second curved portion 432b, the two opposite sides adjacent and connected to the second contact surface 4322 (e.g., corresponding to the first side S1 and the second side S2 of FIG. 4B) are curved surfaces. Accordingly, when the first damping structure 4361 does not correspond to the first contact surface 4321 and the second damping structure 4362 does not correspond to the second contact surface 4322 (e.g., in a flattened state), the resistance between the first rotating shaft 436X and the first curved portion 432a and the second curved portion 432b is small, and the first rotating shaft 436X can rotate more easily.

As shown in FIG. 3A, the fixing structure 4341 of the second fixing portion 434 includes a second sheet portion 4341f and a third curved portion 4341a and a fourth curved portion 4341b connected to the second sheet portion 4341f. The third curved portion 4341a and the fourth curved portion 4341b are separated from each other in the first direction D1. That is, there is a gap between the third curved portion 4341a and the fourth curved portion 4341b in the first direction D1, and the third curved portion 4341a and the fourth curved portion 4341b respectively surround at least a portion of the third end portion 436aY and the fourth end portion 436cY (shown in FIG. 4C). As shown in FIG. 4A, the third curved portion 4341a includes a third contact surface 43411 (e.g., an inner surface) adjacent to the third end portion 436aY (shown in FIG. 4C). As shown in FIG. 4B, the fourth curved portion 4341b includes a fourth contact surface 43412 (for example, an inner surface) adjacent to the fourth end portion 436cY (shown in FIG. 4C), and the third contact surface 43411 and the fourth contact surface 43412 can be a non-curved surface (that is, a flat plane without arc) respectively, which are used to cooperate with the third damping structure 4361Y (shown in FIG. 4C) and the fourth damping structure 4362Y (shown in FIG. 4C) to provide resistance at a specific position (for example, the position in the bent state) during the rotation of the second shaft 436Y. For example, in the bent state shown in FIGS. 4A to 4C, the first contact surface 4321 to the fourth contact surface 43412 are respectively in contact with the first damping structure 4361X to the fourth damping structure 4362Y and are not easy to slide. If the first contact surface 4321 to the fourth contact surface 43412 and the first damping structure 4361X to the fourth damping structure 4362Y are to be rotated and separated from each other, a certain force needs to be applied. Therefore, the first contact surface 4321 to the fourth contact surface 43412 and the first damping structure 4361 to the fourth damping structure 4362Y can jointly form an automatic return structure.

In the third curved portion 4341a, two opposite sides adjacent and connected to the third contact surface 43411 (e.g., corresponding to the first side S1 and the second side S2 of FIG. 4A) are curved surfaces, and in the fourth curved portion 4341b, two opposite sides adjacent and connected to the fourth contact surface 43412 (e.g., corresponding to the first side S1 and the second side S2 of FIG. 4B) are curved surfaces. Therefore, when the third damping structure 4361Y does not correspond to the third contact surface 43411 and the fourth damping structure 4362Y does not correspond to the fourth contact surface 43412 (e.g., in a flattened state), the resistance between the second rotating shaft 436Y and the third curved portion 4341a and the fourth curved portion 4341b is small, and the second rotating shaft 436Y can rotate more easily.

As shown in FIG. 3A, the joint structure 4342 includes a third sheet portion 4342f and a fifth curved portion 4342a and a sixth curved portion 4342b connected to the third sheet portion 4342f, wherein the fifth curved portion 4342a is disposed between the first curved portion 432a and the second curved portion 432b, and the sixth curved portion 4342b is disposed between the third curved portion 4341a and the fourth curved portion 4341b. The first rotating shaft 436X passes through the first curved portion 432a, the second curved portion 432b and the fifth curved portion 4342a, so that the first fixing portion 432 and the joint structure 4342 are pivotally connected to each other. The second rotating shaft 436Y passes through the third curved portion 4341a, the fourth curved portion 4341b and the sixth curved portion 4342b, so that the joint structure 4342 and the fixing structure 4341 are pivotally connected to each other. The first fixing portion 432 and the second fixing portion 434 (the joint structure 4342) may have complementary shapes, and the joint structure 4342 of the second fixing portion 434 and the fixing structure 4341 may have complementary shapes. "Complementary shapes" means that the shapes of the two objects can fit together. For example, when the first fixing portion 432 has a concave portion, the second fixing portion 434 (the joint structure 4342) has a protruding portion at a position corresponding to the concave portion, so the concave portion and the protruding portion can fit together; when the second fixing portion 434 has a concave portion, the joint structure 4342 of the second fixing portion 434 has a protruding portion at a position corresponding to the concave portion, so the concave portion and the protruding portion can fit together. In some embodiments, the fixing structure 4341 of the first fixing portion 432 and the second fixing portion 434 have holes 432h and 4341h, respectively, and the screws SW can pass through the holes 432h and 4341h for locking, as shown in FIG. 5C.

As shown in FIG. 4C, the first curved portion 432a includes a first stop structure 432i, the second curved portion 432b includes a second stop structure 432ii, the third curved portion 4341a includes a third stop structure 4341i, the fourth curved portion 4341b includes a fourth stop structure 4341ii, the fifth curved portion 4342a includes a fifth stop structure 4342i and a sixth stop structure 4342ii, and the sixth curved portion 4342b includes a seventh stop structure 4342iii and an eighth stop structure 4342iv. The first stop structure 432i and the second stop structure 432ii are respectively adjacent to the fifth stop structure 4342i and the sixth stop structure 4342ii, and the third stop structure 4341i and the fourth stop structure 4341ii are respectively adjacent to the seventh stop structure 4342iii and the eighth stop structure 4342iv. The first stop structure 432i to the eighth stop structure 4342iv may respectively include two independent step difference structures (i.e., two non-continuous protruding structures).

Please refer to FIGS. 3A and 3B (FIG. 3B is a schematic diagram viewed from the bottom of FIG. 3A, for example), the mouse structure 40 is in a flattened state, wherein the second sheet portion 4341f corresponds to the first side S1, the first sheet portion 432f corresponds to the second side S2, the second side S2 is opposite to the first side S1, and an angle between the top surface 432t of the first sheet portion 432f and the top surface 4341t of the second sheet portion 4341f is, for example, 180 degrees. The mouse structure may also include a use side SU and a placement side SD. The placement side SD is opposite to the use side SU. The use side SU represents a side (e.g., the upper side) on which the user operates the mouse structure 40, and the placement side SD represents a side (e.g., the lower side) on which the mouse structure 40 is placed on the operating plane. The two independent step difference structures in the first stop structure 432i to the eighth stop structure 4342iv provide stops, for example, on the use side SU and the placement side SD, respectively.

As shown in FIG. 3A or FIG. 3B, when the mouse structure 40 is in a flattened state, the first stop structure 432i and the second stop structure 432ii are respectively engaged with the fifth stop structure 4342i and the sixth stop structure 4342ii on the use side SU, and the third stop structure 4341i and the fourth stop structure 4341ii are respectively engaged with the seventh stop structure 4342iii and the eighth stop structure 4342iv on the use side SU, so that the mouse structure 40 cannot be further bent upward. At the same time, as shown in FIG. 3B, the first stop structure 432i and the second stop structure 432ii have gaps (not in contact) with the fifth stop structure 4342i and the sixth stop structure 4342ii on the placement side SD, and the third stop structure 4341i and the fourth stop structure 4341ii have gaps (not in contact) with the seventh stop structure 4342iii and the eighth stop structure 4342iv on the placement side SD.

As shown in FIG. 4A and FIG. 3A-FIG. 3B, when the mouse structure is in a bent state, the first stop structure 432i and the second stop structure 432ii have gaps (not in contact) with the fifth stop structure 4342i and the sixth stop structure 4342ii on the use side SU, and the third stop structure 4341i and the fourth stop structure 4341ii have gaps (not in contact) with the seventh stop structure 4342iii and the eighth stop structure 4342iv on the use side SU. At the same time, as shown in FIG. 4B, the first stop structure 432i and the second stop structure 432ii are respectively engaged with the fifth stop structure 4342i and the sixth stop structure 4342ii on the placement side SD, and the third stop structure 4341i and the fourth stop structure 4341ii are respectively engaged with the seventh stop structure 4342iii and the eighth stop structure 4342iv on the placement side SD, so that the mouse structure cannot be further bent downward.

Please refer to FIG. 2B and FIG. 5A-FIG. 5D, the back cover 452 covers the first connecting member 430 and the base 454. According to the present embodiment, the first connecting member 430 can be fixed to the base 454 first, and then a portion of the first connecting member 430 adjacent to the first rotating shaft 436X and the second rotating shaft 436Y and the outer part of the base 454 are covered with rubber (for example, solid rubber hot pressing technology or liquid rubber injection molding technology) to form a back cover 452 that is tightly fitted to the first connecting member 430 and the base 454. In other words, the back cover 452 is an integrally formed structure. The back cover 452 not only covers the top surface of the base 454 but also covers the side and bottom surfaces of the base 454. The material of the back cover 452 includes rubber, such as liquid rubber (LSR) or solid rubber (SSR).

Figure 6A:
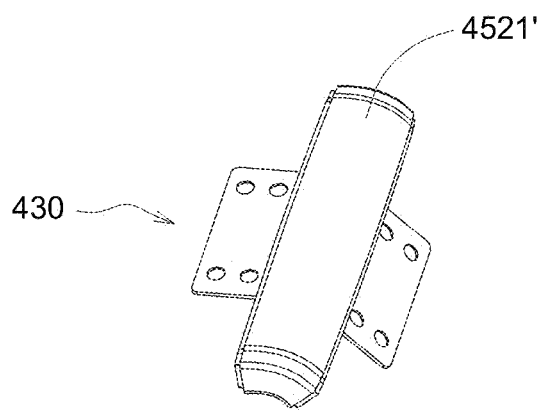
FIG. 6A is a partial three-dimensional view of the mouse structure in a bent state according to another embodiment of the present invention.
Figure 6B:
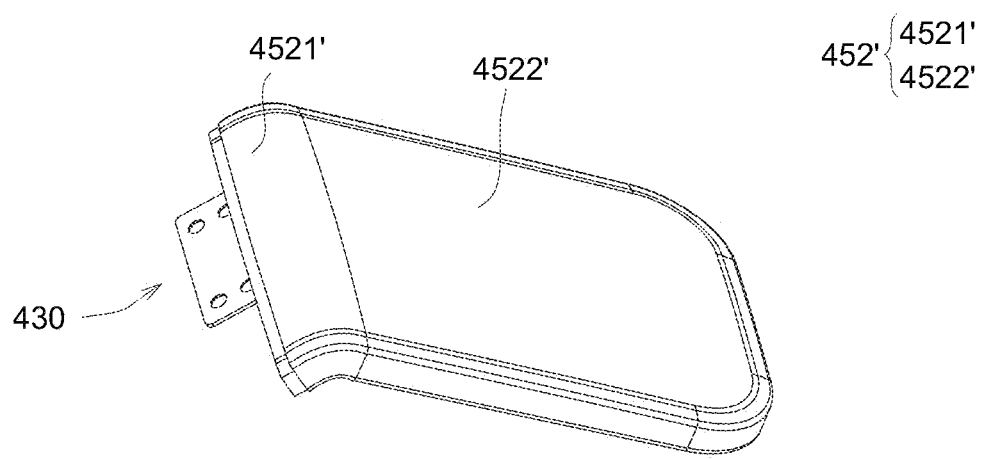
FIG. 6B is a partial three-dimensional view of the mouse structure of FIG. 6A.
Figure 6C:
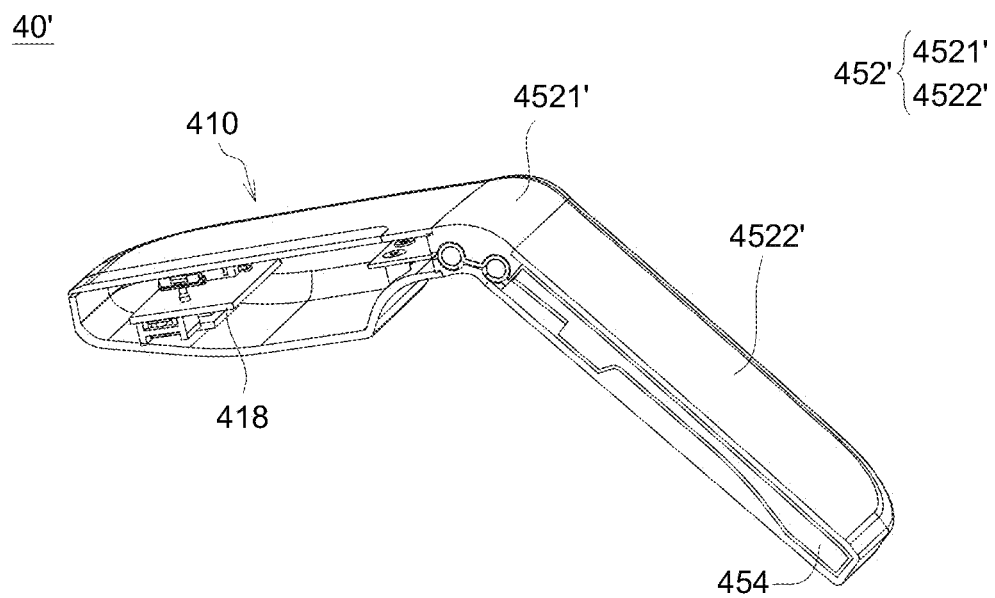
FIG. 6C is a three-dimensional cross-sectional view of the mouse structure of FIG. 6B.
Figure 6D:
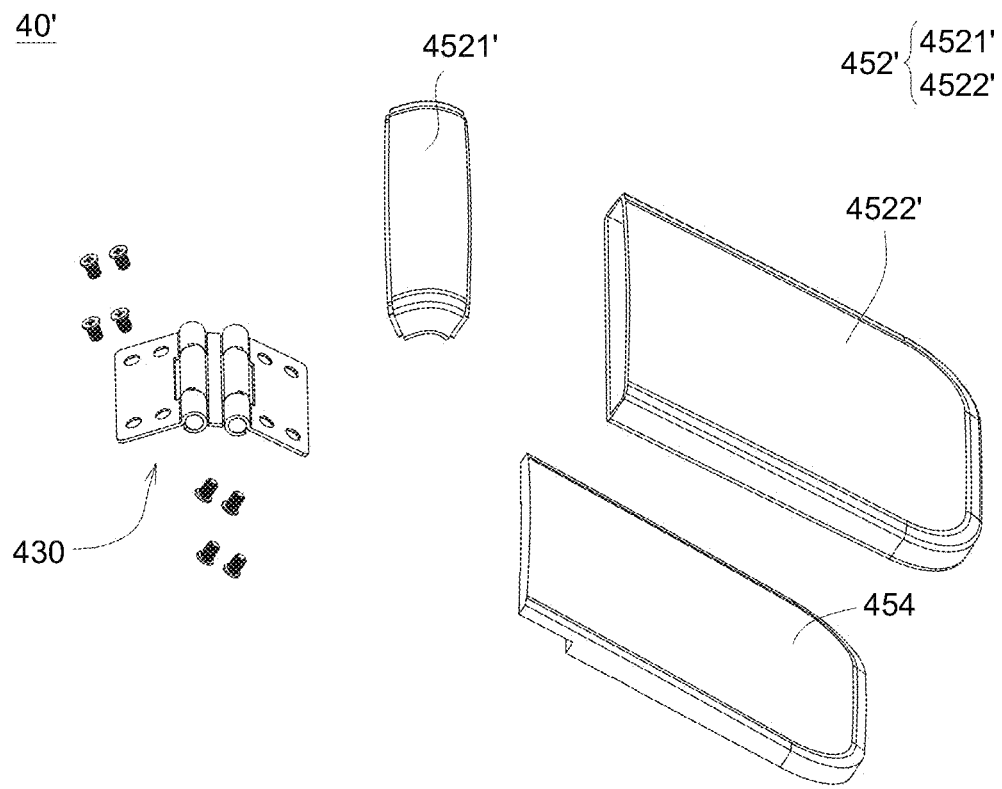
FIG. 6D is a disassembled view of the mouse structure of FIG. 6B.
Figure 6E:
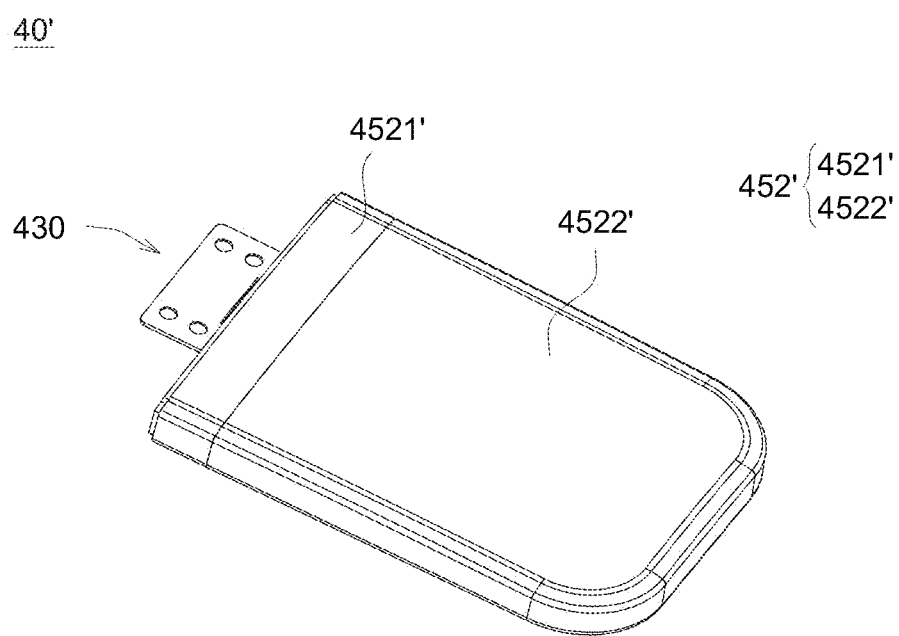
FIG. 6E is a partial three-dimensional view of the mouse structure of FIG. 6A in a flattened state.

FIG. 6A is a partial three-dimensional view of a mouse structure 40' in a bent state according to another embodiment of the present invention. FIG. 6B is a partial three-dimensional view of the mouse structure 40' of FIG. 6A. FIG. 6C is a three-dimensional cross-sectional view of the mouse structure 40' of FIG. 6B. FIG. 6D is a disassembled view of the mouse structure 40' of FIG. 6B. FIG. 6E is a partial three-dimensional view of the mouse structure 40' of FIG. 6A in a flattened state.

The mouse structure 40' shown in FIGS. 6A to 6E is similar to the mouse structure 40, and the main body 410 is omitted. The difference between the mouse structure 40' and the mouse structure 40 is that the back cover 452' is not an integrally formed structure, and the number of the first connecting member 430' is one, and other identical or similar parts will not be described in detail.

As shown in FIGS. 6A to 6E, the back cover 452' covers the first connecting member 430 and the base 454. According to the present embodiment, as shown in FIG. 6A, firstly, a portion of the first connecting member 430 adjacent to the first rotating shaft 436X and the second rotating shaft 436Y is partially covered with rubber (e.g., solid rubber hot pressing technology or liquid rubber injection molding technology) to form a first covering portion 4521'. Next, the first connecting member 430 is fixed to the base 454, and then a portion of the first connecting member 430 adjacent to the base 454, and the base 454 are entirely covered with rubber (e.g., solid rubber hot pressing technology or liquid rubber injection molding technology) to form a second covering portion 4522', as shown in FIG. 6B. That is, the second covering portion 4522' is connected to the first covering portion 4521', the first covering portion 4521' covers the portion of the first connecting member 430 adjacent to the first rotating shaft 436X and the second rotating shaft 436Y, and the second covering portion 4522' covers the portion of the first connecting member 430 adjacent to the base 454 and covers the base 454. The first covering portion 4521' and the second covering portion 4522' are not integrally formed, and together form a back cover 452' that fits tightly to the first connecting member 430 and the base 454. The back cover 452' not only covers the top surface of the base 454, but also covers the side and bottom surfaces of the base 454. The material of the first covering portion 4521' includes rubber, and the material of the second covering portion 4522' is rubber or plastic.

Figure 7A:
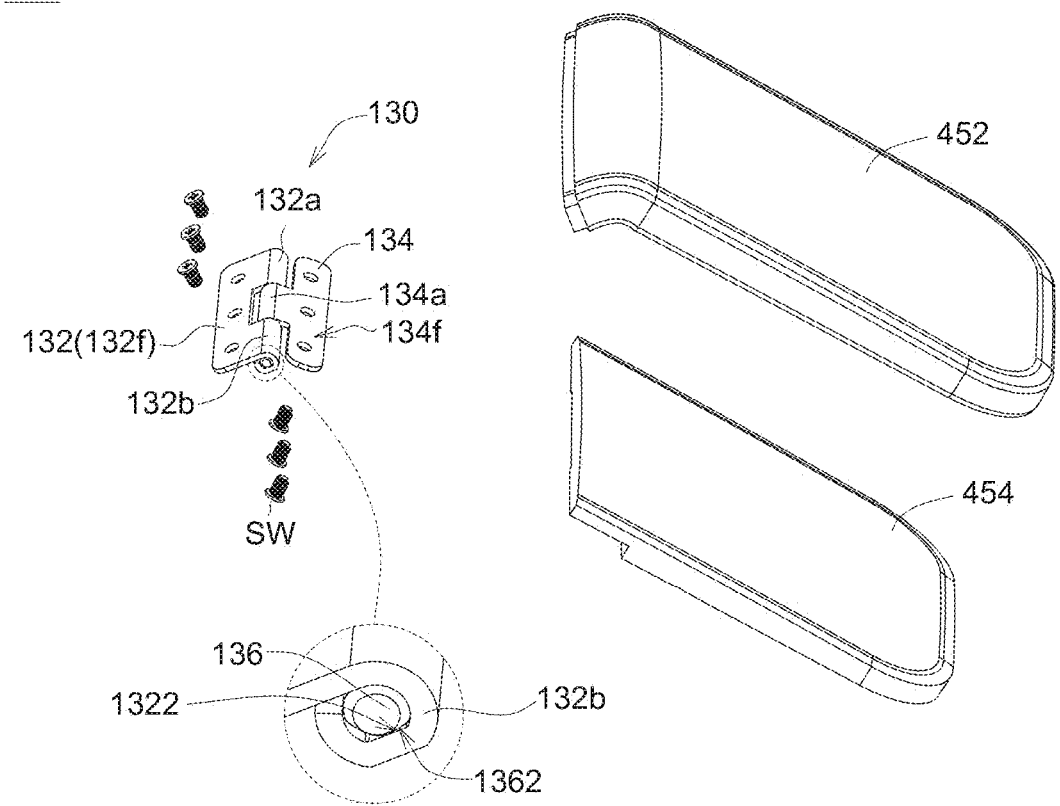
FIG. 7A is a partial disassembled view of the mouse structure in a bent state according to a further embodiment of the present invention.

FIG. 7A is a partial three-dimensional view of a mouse structure 40A in a bent state according to another embodiment of the present invention. The mouse structure 40A is similar to the mouse structure 40, and FIG. 7A omits the main body 410. The difference between the mouse structure 40A and the mouse structure 40 is that the structure of the first connecting member 130 is different from the structure of the first connecting member 430, and other identical or similar parts will not be described in detail.

Referring to FIG. 7A, the first connecting member 130 includes a first fixing portion 132, a second fixing portion 134 and a rotating shaft 136. The first connecting member 130 has only a single rotating shaft 136, not a double rotating shaft structure. In the present embodiment, the first fixing portion 132 is fixed to the main body (not shown), and the second fixing portion 134 is fixed to the extension portion 450. The first damping structure (not shown) and the second damping structure 1362 of the rotating shaft 136 are respectively arranged on the first end portion (not shown) and the second end portion (not shown), and are respectively non-curved surfaces (i.e., a flat plane without arc). The surface of the first damping structure (not shown) is not parallel to the surface of the second damping structure 1362.

The first fixing portion 132 includes a first sheet portion 132f and a first curved portion 132a and a second curved portion 132b connected to the first sheet portion 132f, and the first curved portion 132a and the second curved portion 132b are spaced apart from each other in the first direction D1. The first curved portion 132a includes a first contact surface (not shown) adjacent to the first end portion (not shown), and the second curved portion 132b includes a second contact surface 1322 (e.g., an inner surface) adjacent to the second end portion (not shown). The first contact surface (not shown) and the second contact surface 1322 can be a non-curved surface (i.e., a flat plane without arc) respectively, and are used to cooperate with the first damping structure (not shown) and the second damping structure 1362 to provide resistance at a specific position (e.g., a flat state and a bent state) during the rotation of the rotating shaft 136. The second fixing portion 134 includes a second sheet portion 134f and a curved portion 134a connected to the middle portion of the second sheet portion 134f, the curved portion 134a surrounds at least a portion of the middle portion (not shown) of the rotating shaft 136, and the curved portion 134a of the second fixing portion 134 is disposed between the first curved portion 132a and the second curved portion 132b of the first fixing portion 132.

Figure 7B:
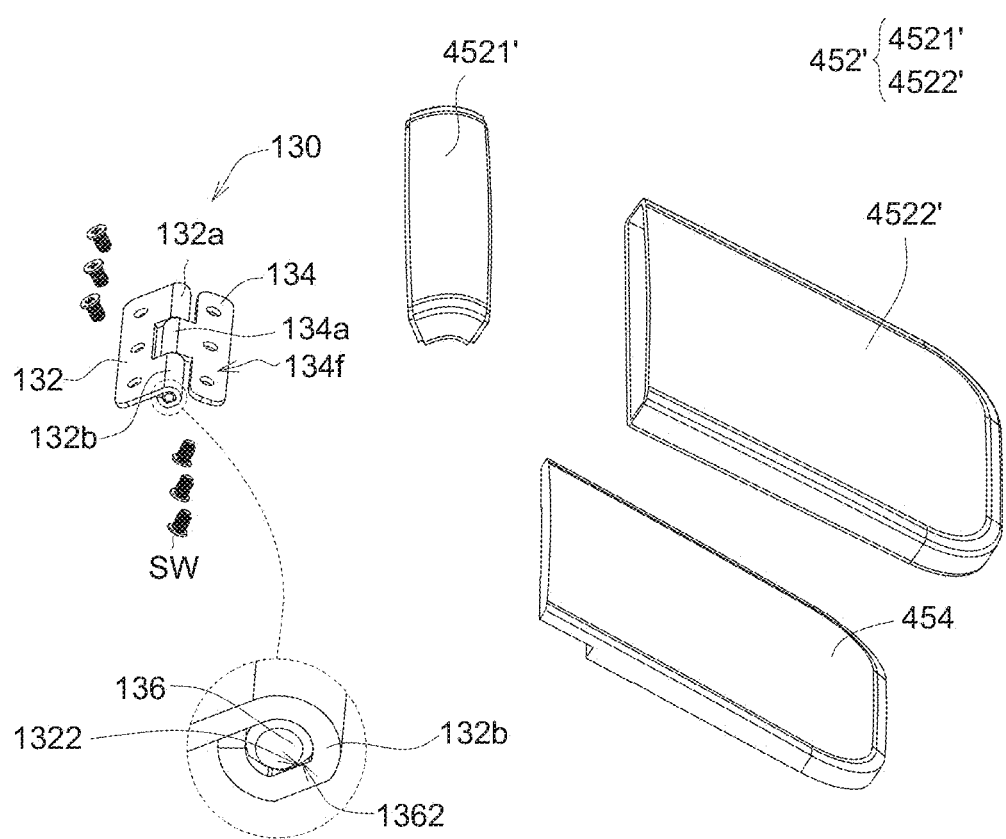
FIG. 7B is a partial disassembled view of the mouse structure in a bent state according to a further embodiment of the present invention.

FIG. 7B is a partial three-dimensional view of a mouse structure 40B in a bent state according to another embodiment of the present invention. The mouse structure 40B is similar to the mouse structure 40' (FIGS. 6A-6D), and FIG. 7B omits the main body 410. The difference between the mouse structure 40B and the mouse structure 40' is that the structure of the first connecting member 130 is different from the structure of the first connecting member 430. The structure of the first connecting member 130 of FIG. 7B is the same as the structure of the first connecting member 130 of FIG. 7A. Other identical or similar parts will not be described in detail.

Figure 8:
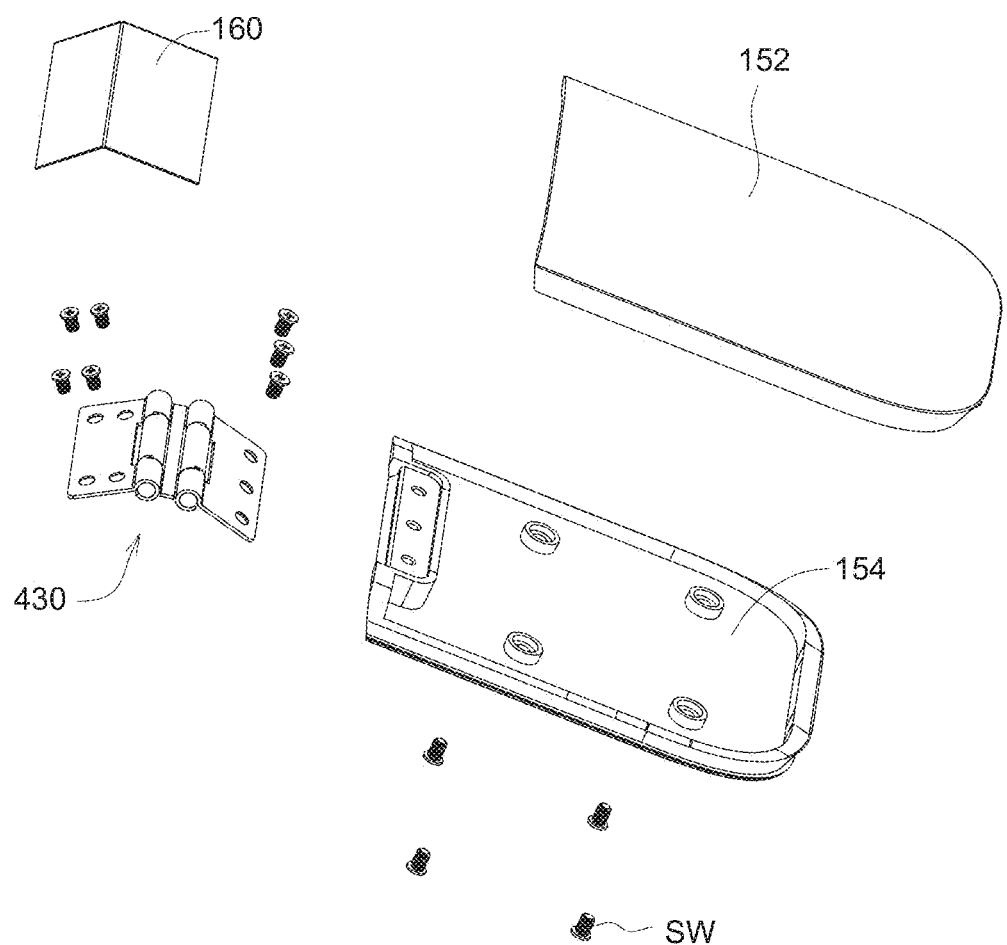
FIG. 8 is a partial disassembled view of the mouse structure in a bent state according to a further embodiment of the present invention.

FIG. 8 is a partial three-dimensional view of a mouse structure 40C in a bent state according to another embodiment of the present invention. The mouse structure 40C is similar to the mouse structure 40, and FIG. 8 omits the main body 410. The difference between the mouse structure 40C and the mouse structure 40 is that the structures of the back cover 152 and the base 154 are different from the structures of the back cover 452 and the base 454, and the mouse structure 40C further includes a shielding sheet 160, and the number of the first connecting member 430 is one. Other identical or similar parts will not be described in detail.

As shown in FIG. 8, the shielding sheet 160 is disposed between the first connecting member 430 and the back cover 152 to shield the first connecting member 430 exposed by the gap between the main body 410 and the extension portion 450. The shielding sheet 160 can be an elastomer or other suitable shielding structure. The back cover 152 and the base 154 are locked, for example, by screws SW. The back cover 152 only covers the top surface of the base 154, and does not cover the side and bottom surfaces of the base 154.

Compared with the mouse structure 40C, the back cover 452 in the mouse structure 40 (for example, formed by hot pressing technology) has better fit and structural strength than the shielding sheet 160. Even when the gap between the main body 410 and the extension portion 450 in the back cover 452 is pressed, it is still not easy to produce depressions or wrinkles, which can give users a better use experience and look more beautiful.

Figure 9A:
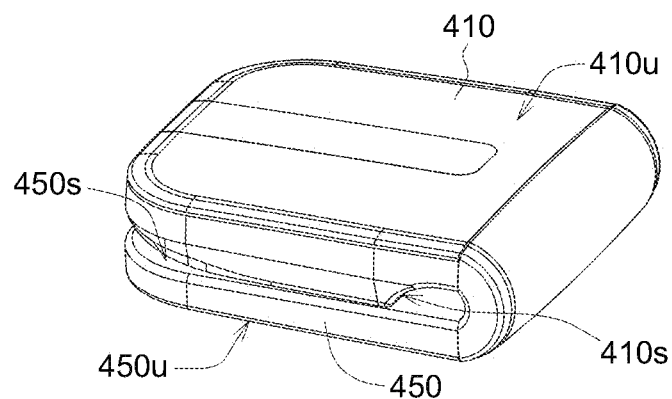
FIG. 9A is a three-dimensional view of the mouse structure in a folded state according to a further embodiment of the present invention.
Figure 9B:
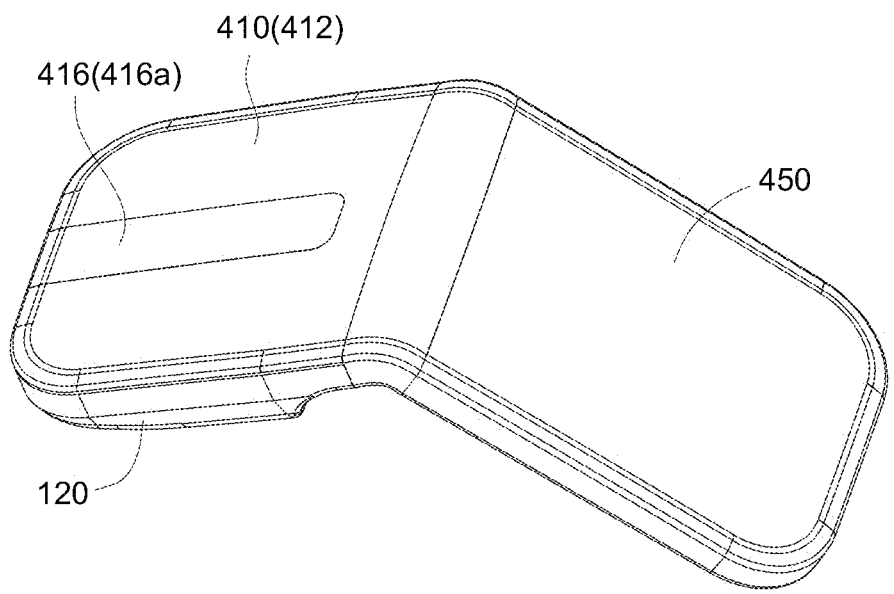
FIG. 9B is a three-dimensional view of the mouse structure of FIG. 9A in a bent state.
Figure 10A:
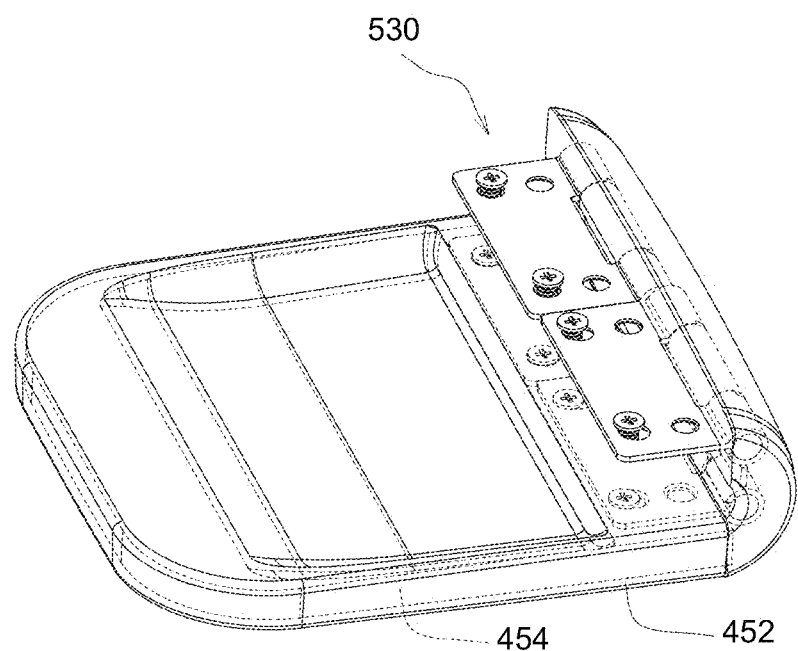
FIG. 10A is a partial stereogram of the mouse structure of FIG. 9A in a folded state.
Figure 10B:
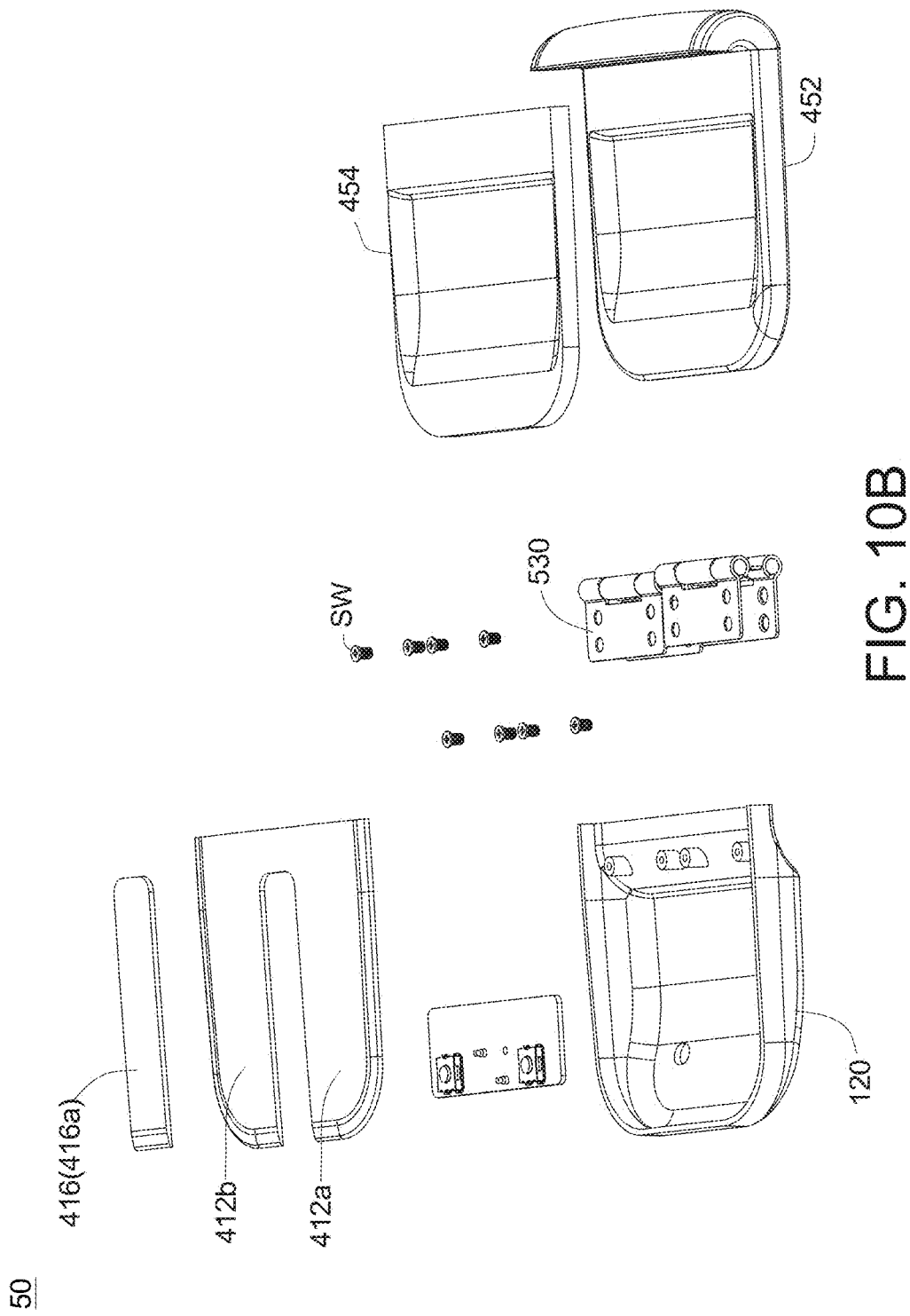
FIG. 10B is a disassembled view of the mouse structure of FIG. 9A in a folded state.
Figure 11A:
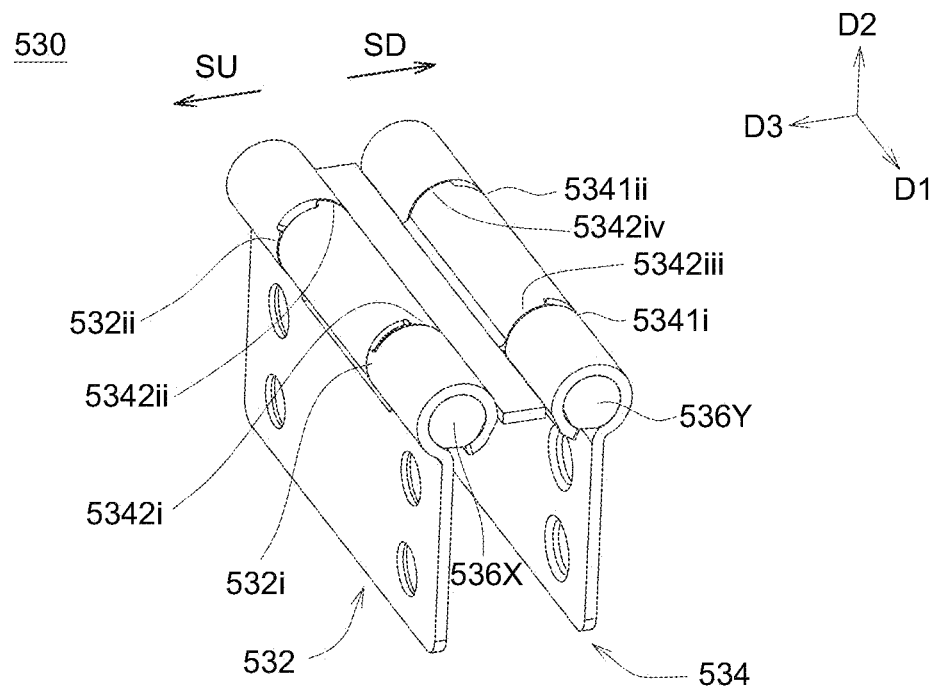
FIG. 11A is a three-dimensional view of the first connecting member of the mouse structure of FIG. 9A in a folded state.
Figure 11B:
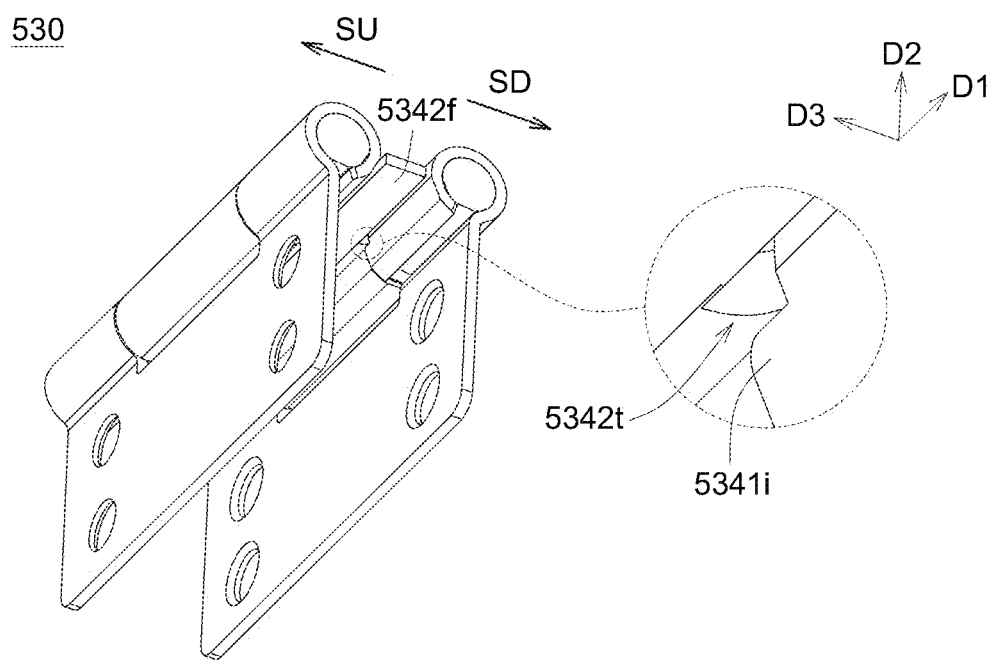
FIG. 11B is a three-dimensional view of the first connecting member of the mouse structure of FIG. 9A in a folded state from another perspective.
Figure 12A:
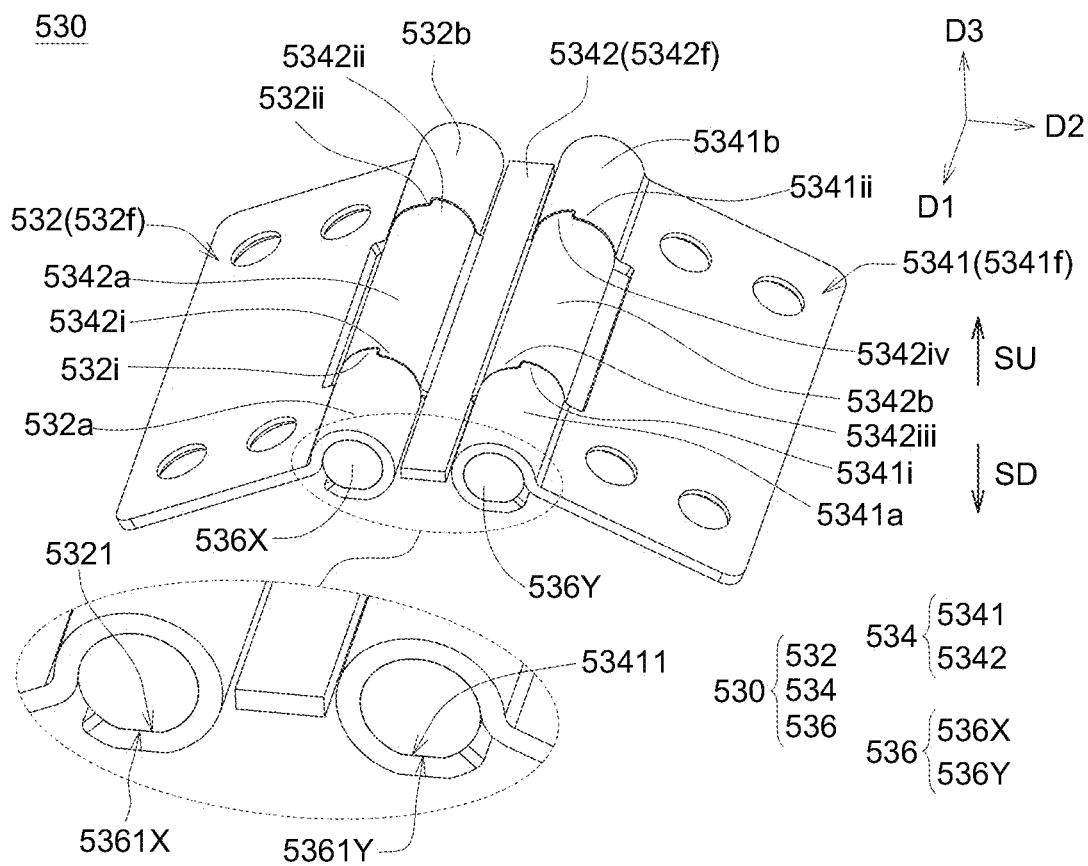
FIG. 12A is a three-dimensional view of the first connecting member of the mouse structure of FIG. 9A in a bent state.
Figure 12B:
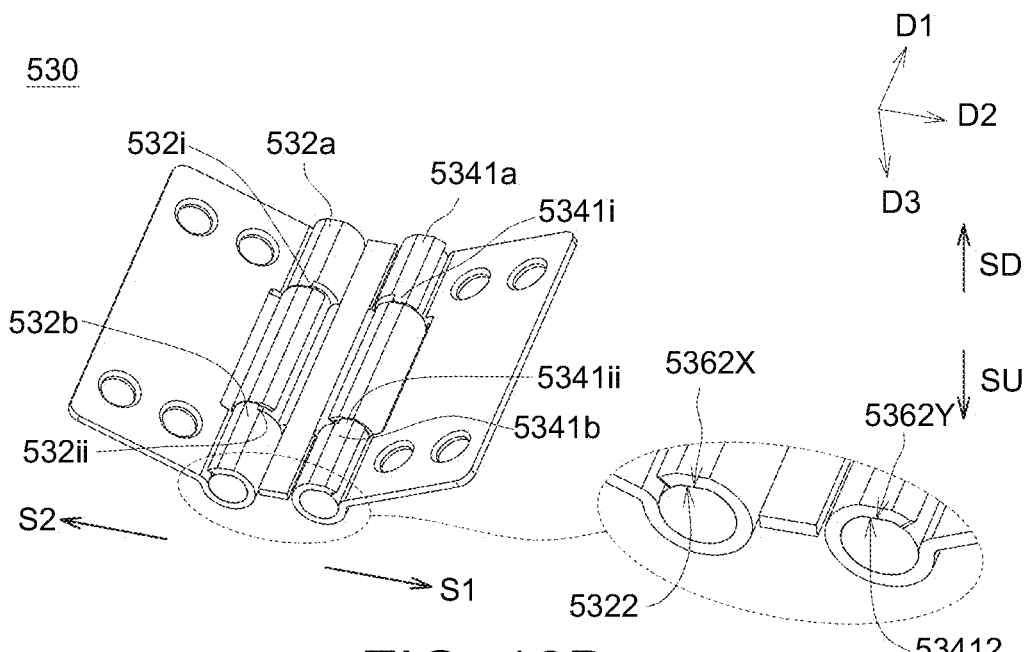
FIG. 12B is a three-dimensional view of the first connecting member of the mouse structure of FIG. 9A in a bent state from another perspective.
Figure 12C:
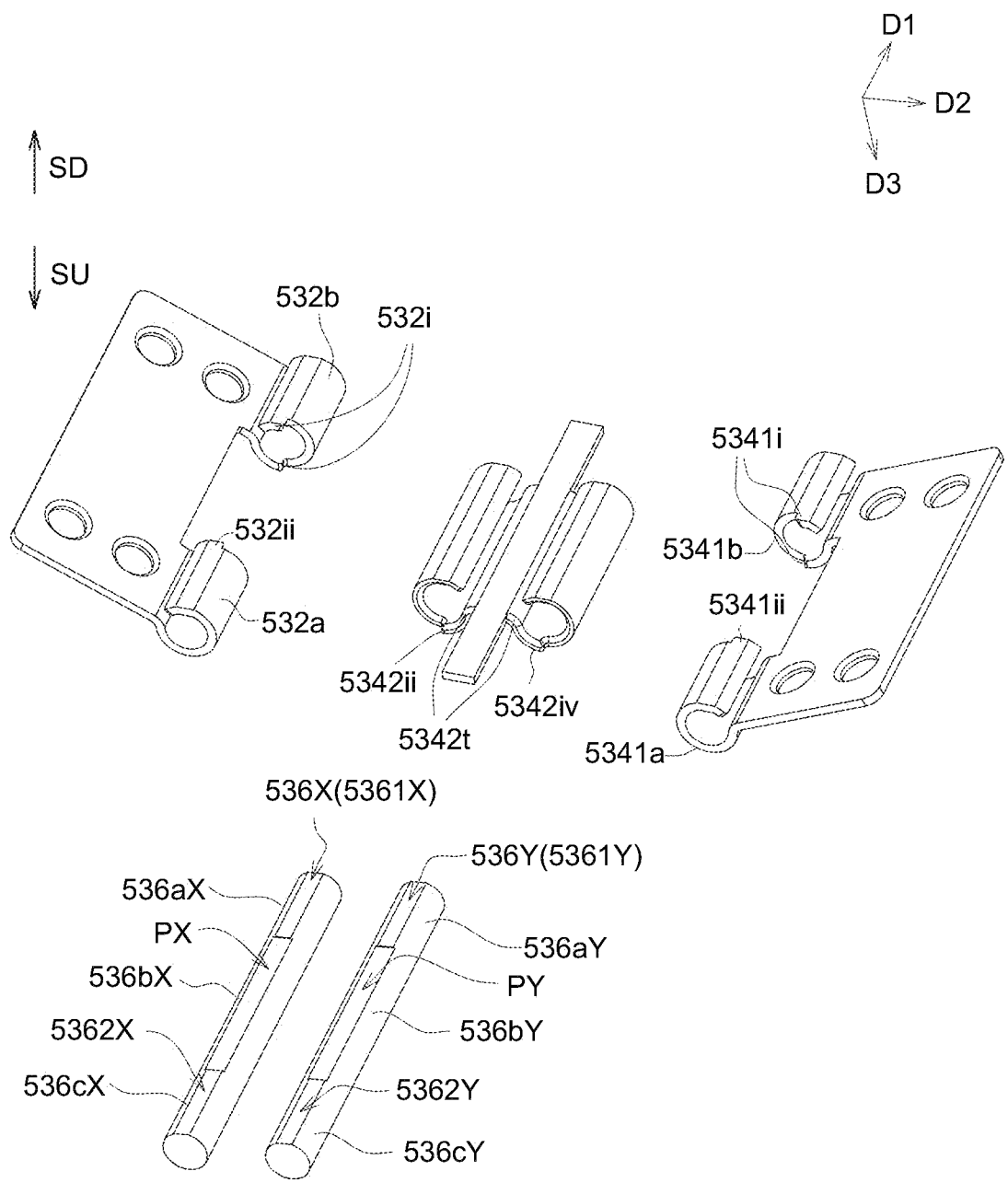
FIG. 12C is a disassembled view of the first connecting member of FIG. 12B.

FIG. 9A is a three-dimensional view of a mouse structure 50 in a folded state according to a further embodiment of the present invention. FIG. 9B is a three-dimensional view of the mouse structure 50 in FIG. 9A in a bent state. FIG. 10A is a partial three-dimensional view of the mouse structure 50 in FIG. 9A in a folded state (the main body 410 is omitted). FIG. 10B is a disassembled view of the mouse structure 50 in FIG. 9A in a folded state. FIG. 11A is a three-dimensional view of the first connecting member 530 of the mouse structure 50 in FIG. 9A in a folded state. FIG. 11B is a three-dimensional view of the first connecting member 530 of the mouse structure 50 in FIG. 9A in a folded state from another perspective. FIG. 12A is a three-dimensional view of the first connecting member 530 of the mouse structure 50 of FIG. 9A in a bent state. FIG. 12B is a three-dimensional view of the first connecting member 530 of the mouse structure 50 of FIG. 9A in a bent state from another perspective. FIG. 12C is a disassembled view of the first connecting member 530 of FIG. 12B.

The difference between the mouse structure 50 and the mouse structure 40 is that the folded state of the mouse structure 50 is different from the bent state of the mouse structure 40, so the structure of the first connecting member 530 is different from the structure of the first connecting member 430, and other identical or similar parts will not be described in detail.

When the user does not need to use the mouse structure 50 for work, the mouse structure 50 can be folded, which is convenient for storage and carrying, as shown in FIG. 9A. When the user needs to use the mouse structure 50 for work, the mouse structure 50 can be in a bent state, so that the user's hand can comfortably grasp the mouse structure 50 and easy to operate the mouse structure 50, as shown in FIG. 9B.

Please refer to FIGS. 10A-10B at the same time. The back cover 452 covers the first connecting member 530 and the base 454. In the present embodiment, the back cover 452 is the same as the back cover 452 shown in FIGS. 5A to 5D, and is an integrally formed structure. In other embodiments, the back cover 452 can be replaced by a back cover 452' (as shown in FIGS. 6A to 6D), which is not an integrally formed structure.

Please refer to FIGS. 11A to 12C at the same time. The first connecting member 530 includes a first fixing portion 532, a second fixing portion 534 and at least one rotating shaft 536. In the present embodiment, the first fixing portion 532 is fixed to the main body 410, and the second fixing portion 534 is fixed to the extension portion 450. However, the present invention is not limited thereto. In other embodiments, the first fixing portion 532 is fixed to the extension portion 450, and the second fixing portion 534 is fixed to the main body 410.

In the present embodiment, the number of first connecting members 530 is two, and the two first connecting members 530 are arranged side by side between the main body 410 and the extension portion 450. The number of rotating shafts 536 of each of the first connecting members 530 is two (that is, there are four rotating shafts 536 in total). For example, at least one rotating shaft 536 includes a first rotating shaft 536X and a second rotating shaft 536Y. The first rotating shaft 536X and the second rotating shaft 536Y are adjacent to each other and parallel to each other. The structures of the two first connecting members 530 are, for example, the same as each other, and FIGS. 11A to 12C only exemplarily show one of the first connecting members 530. It should be understood that the number of the first connecting members 530 and the rotating shafts 536 of the present invention is not limited thereto.

The first rotating shaft 536X passes through the first fixing portion 532 and the second fixing portion 534, so that the first fixing portion 532 and the second fixing portion 534 are pivotally connected to each other. That is, the main body 410 and the extension portion 450 are pivotally connected to each other through the first connecting member 530. The second fixing portion 534 includes a fixing structure 5341 and a joint structure 5342 that are pivotally connected to each other. The joint structure 5342 is disposed between the first fixing portion 532 and the fixing structure 5341. The first rotating shaft 536X passes through the first fixing portion 532 and the joint structure 5342, and the second rotating shaft 536Y passes through the fixing structure 5341 and the joint structure 5342. As shown in FIG. 12C, the first rotating shaft 536X includes a first damping structure 5361X and a second damping structure 5362X, and the second rotating shaft 536Y includes a first damping structure 5361Y and a second damping structure 5362Y. The first damping structure 5361X and the second damping structure 5362X may be connected to each other or not, and the first damping structure 5361Y and the second damping structure 5362Y may be connected to each other or not. The sizes of the first damping structure 5361X and the second damping structure 5362X may be the same or different from each other, and the sizes of the first damping structure 5361Y and the second damping structure 5362Y may be the same or different from each other. In some embodiments, the sizes of the damping structures are different. For example, the sizes of the first damping structure 5361X and the second damping structure 5362X are different from the sizes of the first damping structure 5361Y and the second damping structure 5362Y, respectively, to ensure that the first rotating shaft 536X and the second rotating shaft 536Y have a certain fixed sequence in the front and back parts when the user closes or opens the mouse structure 50. In the present embodiment, the first damping structure 5361X is not connected to the second damping structure 5362X, and the first damping structure 5361Y is not connected to the second damping structure 5362Y. That is, there is an enlarged platform PX between the first damping structure 5361X and the second damping structure 5362X, and there is an enlarged platform PY between the first damping structure 5361Y and the second damping structure 5362Y, and the enlarged platforms PX and PY can form a fastening configuration. In detail, the first rotating shaft 536X includes a first end portion 536aX, a first middle portion 536bX and a second end portion 536cX extending axially (i.e. extending along the first direction D1), the first middle portion 536bX is connected between the first end portion 536aX and the second end portion 536cX, and the first damping structure 5361X and the second damping structure 5362X are respectively disposed on the first end portion 536aX and the second end portion 536cX. The second rotating shaft 536Y includes a third end portion 536aY, a second middle portion 536bY and a fourth end portion 536cY extending axially (i.e. extending along the first direction D1), the second middle portion 536bY is connected between the third end portion 536aY and the fourth end portion 536cY, and the third damping structure 5361Y and the fourth damping structure 5362Y are respectively disposed on the third end portion 536aY and the fourth end portion 536cY. The first damping structure 5361X, the second damping structure 5362X, the third damping structure 5361Y and the fourth damping structure 5362Y can be a non-curved surface (i.e., a flat plane without arc) respectively, which are used to provide resistance at a specific position (e.g., a position in a bent state) during the rotation of the first rotating shaft 536X and the second rotating shaft 536Y. In the present embodiment, the structures of the first rotating shaft 536X and the second rotating shaft 536Y are the same as the first rotating shaft 436X and the second rotating shaft 436Y, but the present invention is not limited thereto.

As shown in FIG. 12A, the first fixing portion 532 includes a first sheet portion 532f and a first curved portion 532a and a second curved portion 532b connected to the first sheet portion 532f, and the first curved portion 532a and the second curved portion 532b are separated from each other in the first direction D1. The first curved portion 532a includes a first contact surface 5321 (e.g., an inner surface) adjacent to the first end portion 536a. As shown in FIG. 12B, the second curved portion 532b includes a second contact surface 5322 (e.g., an inner surface) adjacent to the second end portion 536c. The first contact surface 5321 and the second contact surface 5322 may be a non-curved surface (i.e., a flat plane without arc) respectively, and are used to cooperate with the first damping structure 5361X and the second damping structure 5362X to provide resistance at a specific position (e.g., a position in a bent state) during the rotation of the first rotating shaft 536X.

As shown in FIG. 12A, the fixing structure 5341 of the second fixing portion 534 includes a second sheet portion 5341f and a third curved portion 5341a and a fourth curved portion 5341b connected to the second sheet portion 5341f. The third curved portion 5341a and the fourth curved portion 5341b are separated from each other in the first direction D1. The third curved portion 5341a includes a third contact surface 53411 (e.g., an inner surface) adjacent to the third end portion 536aY (shown in FIG. 12C). As shown in FIG. 12B, the fourth curved portion 5341b includes a fourth contact surface 53412 (e.g., inner surface) adjacent to the fourth end portion 536cY. The third contact surface 53411 and the fourth contact surface 53412 may be a non-curved surface (i.e., a flat plane without) respectively, and are used to cooperate with the third damping structure 5361Y and the fourth damping structure 5362Y to provide resistance at a specific position (e.g., a bent position) during the rotation of the second rotating shaft 536Y. The first contact surface 5321 to the fourth contact surface 53412 and the first damping structure 5361 to the fourth damping structure 5362Y may together form an automatic return structure.

The joint structure 5342 includes a third sheet portion 5342f and a fifth curved portion 5342a and a sixth curved portion 5342b connected to the third sheet portion 5342f. The fifth curved portion 5342a is disposed between the first curved portion 532a and the second curved portion 532b, and the sixth curved portion 5342b is disposed between the third curved portion 5341a and the fourth curved portion 5341b. The first rotating shaft 536X passes through the first curved portion 532a, the second curved portion 532b and the fifth curved portion 5342a, so that the first fixing portion 532 and the joint structure 5342 are pivotally connected to each other. The second rotating shaft 536Y passes through the third curved portion 5341a, the fourth curved portion 5341b and the sixth curved portion 5342b, so that the joint structure 5342 and the fixing structure 5341 are pivotally connected to each other.

The first curved portion 532a includes a first stop structure 532i, the second curved portion 532b includes a second stop structure 532ii, the third curved portion 5341a includes a third stop structure 5341i, the fourth curved portion 5341b includes a fourth stop structure 5341ii, the fifth curved portion 5342a includes a fifth stop structure 5342i and a sixth stop structure 5342ii, and the sixth curved portion 5342b includes a seventh stop structure 5342iii and an eighth stop structure 5342iv. The first stop structure 532i and the second stop structure 532ii are adjacent to the fifth stop structure 5342i and the sixth stop structure 5342ii, respectively, and the third stop structure 5341i and the fourth stop structure 5341ii are adjacent to the seventh stop structure 5342iii and the eighth stop structure 5342iv, respectively. The first stop structure 532i to the fourth stop structure 5341iv may include two independent step structures (i.e., two non-continuous protruding structures) respectively.

As shown in FIGS. 9A and 9B. The mouse structure 50 may include an outer side and an inner side. For example, when the mouse structure 50 is folded, the inner surface 410s of the main body 410 is adjacent to the inner surface 450s of the extension portion 450 (for example, through magnetic attraction, but the present invention is not limited thereto), so that the inner surface 410s of the main body 410 and the inner surface 450s of the extension portion 450 correspond to the inner side of the mouse structure 50, and the outer surface 410u of the main body 410 and the outer surface 450u of the extension portion 450 correspond to the outer side of the mouse structure 50. The outer surface 410u and the outer surface 450u are respectively opposite to the inner surface 410s and the inner surface 450s. As shown in FIGS. 11B and 12C, each of the fifth stop structure 5342i to the eighth stop structure 5342iv includes one step structure (not two independent step structures) and a stop protrusion 5342t adjacent to the step structure, and the stop protrusion 5342t is connected to the third sheet portion 5342f and protrudes inward.

As shown in FIG. 11A, when the mouse structure 50 is folded, the first stop structure 532i and the second stop structure 532ii have gaps (not in contact) on the outside with the fifth stop structure 5342i and the sixth stop structure 5342ii, respectively, and the third stop structure 5341i (FIG. 11B) and the fourth stop structure 5341ii have gaps (not in contact) on the outside with the seventh stop structure 5342iii and the eighth stop structure 5342iv, respectively. At the same time, as shown in FIG. 11B, FIG. 11A and FIG. 12A, the first stop structure 532i and the second stop structure 532ii are respectively engaged with the stop protrusion 5342t of the fifth stop structure 5342i and the sixth stop structure 5342ii on the inner side, and the third stop structure 5341i and the fourth stop structure 54341ii are respectively engaged with the stop protrusion 5342t of the seventh stop structure 5342iii and the eighth stop structure 5342iv on the inner side.

The mouse structure 50 may also include a use side SU and a placement side SD. The placement side SD is opposite to the use side SU. The use side SU represents one side (e.g., the upper side) on which the user operates the mouse structure 50, and the placement side SD represents one side (e.g., the lower side) on which the mouse structure 40 is placed on the operating plane.

As shown in FIG. 12A, when the mouse structure 50 is in a bent state, the first stop structure 532i and the second stop structure 532ii are respectively engaged with the fifth stop structure 5342i and the sixth stop structure 5342ii on the use side SU, and the third stop structure 5341i and the fourth stop structure 5341ii are respectively engaged with the seventh stop structure 5342iii and the eighth stop structure 5342iv on the use side SU, so that the mouse structure 50 cannot be further bent upward. At the same time, as shown in FIGS. 12A to 12C, since each of the fifth stop structure 5342i to the eighth stop structure 5342iv has only one step difference structure, rather than two independent step difference structures, the first stop structure 532i and the second stop structure 532ii have a gap (not in contact) with the fifth stop structure 5342i and the sixth stop structure 5342ii on the placement side SD, and the third stop structure 5341i and the fourth stop structure 5341ii have a gap (not in contact) with the seventh stop structure 5342iii and the eighth stop structure 5342iv on the placement side SD.

The present invention exemplarily proposes an embodiment of two-section mouse structures 40-50, but the present invention is not limited thereto. In other embodiments, the mouse structure may be a three-section mouse or a mouse structure greater than a three-section mouse.

In summary, one embodiment of the present invention proposes a mouse structure, such as a bendable mouse structure. In one embodiment, the bendable mouse structure can be switched between a flat state and a bent state. In another embodiment, the bendable mouse structure can be switched between a bent state and a folded state. The mouse structure includes a main body, an extension portion, and at least one first connecting member. The main body includes a button portion. The first connecting member is connected between the main body and the extension portion. The first connecting member includes a first fixing portion, a second fixing portion, and at least one rotating shaft. The first fixing portion is fixed to one of the main body and the extension portion. The second fixing portion is fixed to another one of the main body and the extension portion. The rotating shaft passes through the first fixing portion and the second fixing portion, so that the first fixing portion and the second fixing portion are pivotally connected to each other, wherein the rotating shaft includes a first damping structure and a second damping structure. With the mouse structure of the present invention, the user can manually flatten or bend (or manually bend or fold) the mouse structure in a simple manner, so that the mouse structure is in a flat state (or folded state) for easy carrying, or in a bent state for better working. Compared to a mouse structure that cannot be bent, the mouse structure of the present invention can change its appearance according to the user's usage needs, and is more convenient in storage or carrying.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A bendable mouse structure, comprising:
    a main body, comprising a button portion;
    an extension portion; and
    at least one first connecting member connected between the main body and the extension portion, wherein the at least one first connecting member comprises:
    a first fixing portion fixed to one of the main body and the extension portion;
    a second fixing portion fixed to another one of the main body and the extension portion; and
    a first rotating shaft and a second rotating shaft passing through the first fixing portion and the second fixing portion, respectively, wherein
    the second fixing portion comprises a fixing structure and a joint structure pivotally connected to each other, and
    the second rotating shaft passes through the fixing structure and the joint structure.

2. The bendable mouse structure according to claim 1, wherein the first rotating shaft comprising an first end portion, a first middle portion and a second end portion extending axially, the first middle portion is connected between the first end portion and the second end portion, the first damping structure and the second damping structure are respectively arranged on the first end portion and the second end portion; the first fixing portion comprises a first sheet portion and a first curved portion and a second curved portion connected to the first sheet portion, the first curved portion and the second curved portion respectively surround at least a portion of the first end portion and the second end portion; and
    the first curved portion comprises a first contact surface, the second curved portion comprises a second contact surface; the mouse structure is in a bent state, the first contact surface corresponds to the first damping structure to provide resistance, and the second contact surface corresponds to the second damping structure to provide resistance, wherein the first contact surface, the second contact surface, the first damping structure and the second damping structure are non-curved surfaces.

3. The bendable mouse structure according to claim 2, wherein, the second rotating shaft comprises a third end portion, a second middle portion and a fourth end portion extending axially, the second middle portion is connected between the third end portion and the fourth end portion;
    the fixing structure comprises a second sheet portion and a third curved portion and a fourth curved portion connected to the second sheet portion, the third curved portion and the fourth curved portion surround at least a portion of the third end portion and the fourth end portion, respectively;
    the joint structure comprises a third sheet portion and a fifth curved portion and a sixth curved portion connected to the third sheet portion, the fifth curved portion is disposed between the first curved portion and the second curved portion, and the sixth curved portion is disposed between the third curved portion and the fourth curved portion;
    the first rotating shaft passes through the first curved portion, the second curved portion and the fifth curved portion, so that the first fixing portion and the joint structure are pivotally connected to each other; the second rotating shaft passes through the third curved portion, the fourth curved portion and the sixth curved portion, so that the joint structure and the fixing structure are pivotally connected to each other; and
    the second rotating shaft comprises a third damping structure and a fourth damping structure, the third damping structure and the fourth damping structure are respectively disposed on the third end portion and the fourth end portion, wherein the third damping structure and the fourth damping structure are non-curved surfaces, respectively.

4. The bendable mouse structure according to claim 3, wherein the first curved portion comprises a first stop structure, the second curved portion comprises a second stop structure, the third curved portion comprises a third stop structure, the fourth curved portion comprises a fourth stop structure, the fifth curved portion comprises a fifth stop structure and a sixth stop structure, the sixth curved portion comprises a seventh stop structure and an eighth stop structure, and
    the first stop structure and the second stop structure are respectively adjacent to the fifth stop structure and the sixth stop structure, and the third stop structure and the fourth stop structure are respectively adjacent to the seventh stop structure and the eighth stop structure.

5. The bendable mouse structure according to claim 4, wherein, the mouse structure is in a flattened state, the first stop structure and the second stop structure are respectively engaged with the fifth stop structure and the sixth stop structure on a use side, and the third stop structure and the fourth stop structure are respectively engaged with the seventh stop structure and the eighth stop structure on the use side, wherein the use side represents a side on which a user operates the mouse structure.

6. The bendable mouse structure according to claim 4, wherein, the mouse structure is in a bent state, the first stop structure and the second stop structure are respectively engaged with the fifth stop structure and the sixth stop structure on a placement side, and the third stop structure and the fourth stop structure are respectively engaged with the seventh stop structure and the eighth stop structure on the placement side, wherein the placement side is opposite to a use side, and the use side represents a side on which a user operates the mouse structure.

7. The bendable mouse structure according to claim 4, wherein, the mouse structure is in a bent state, the first stop structure and the second stop structure are respectively engaged with the fifth stop structure and the sixth stop structure on a use side, and the third stop structure and the fourth stop structure are respectively engaged with the seventh stop structure and the eighth stop structure on the use side, wherein the use side represents a side on which a user operates the mouse structure.

8. The bendable mouse structure according to claim 4, wherein, the mouse structure is in a folded state, an inner surface of the main body is adjacent to an inner surface of the extension portion, so that the inner surface of the main body and the inner surface of the extension portion correspond to an inner side of the mouse structure, and the fifth stop structure, the sixth stop structure, the seventh stop structure and the eighth stop structure respectively comprise a step structure and a stop protrusion adjacent to the step structure, and the stop protrusions are connected to the third sheet portion and protrude toward the inner side, wherein the first stop structure and the second stop structure are respectively engaged with the stop protrusions of the fifth stop structure and the sixth stop structure on the inner side, and the third stop structure and the fourth stop structure are respectively engaged with the stop protrusions of the seventh stop structure and the eighth stop structure on the inner side.

9. The mouse structure according to claim 1, wherein the extension portion comprises a back cover and a base, the base is buried in the back cover, and the back cover covers the first connecting member and the base.

10. The mouse structure according to claim 9, wherein the back cover is an integrally formed structure.

11. The mouse structure according to claim 10, wherein a material of the back cover comprises rubber.

12. The mouse structure according to claim 9, wherein the back cover comprises a first covering portion and a second covering portion connected to the first covering portion, the first covering portion covers a portion of the first connecting member adjacent to the at least one rotating shaft, and the second covering portion covers a portion of the first connecting member adjacent to the base and covers the base.

13. The mouse structure according to claim 12, wherein a material of the first covering portion comprises rubber, and a material of the second covering portion is rubber or plastic.

14. The bendable mouse structure according to claim 1, wherein at least one first connecting member is in a plurality, and the first connecting members are disposed side by side between the main body and the extension portion.

* * * * *